US008825388B2

(12) United States Patent
Khorashadi et al.

(10) Patent No.: US 8,825,388 B2
(45) Date of Patent: Sep. 2, 2014

(54) INDOOR LIKELIHOOD HEATMAP

(75) Inventors: Behrooz Khorashadi, Mountain View, CA (US); Rajarshi Gupta, Sunnyvale, CA (US); Saumitra Mohan Das, San Jose, CA (US); Alok Aggarwal, Foster City, CA (US)

(73) Assignee: QUALCOMM Incorporated, San Diego, CA (US)

(*) Notice: Subject to any disclaimer, the term of this patent is extended or adjusted under 35 U.S.C. 154(b) by 150 days.

(21) Appl. No.: 13/180,464

(22) Filed: Jul. 11, 2011

(65) Prior Publication Data

US 2012/0044265 A1 Feb. 23, 2012

Related U.S. Application Data

(60) Provisional application No. 61/363,984, filed on Jul. 13, 2010.

(51) Int. Cl.
G01C 21/00 (2006.01)
(52) U.S. Cl.
USPC ............ 701/434; 701/26; 701/409; 701/416; 701/467
(58) Field of Classification Search
CPC .... G01C 21/20; G01C 21/206; G01C 21/165; G01C 15/02; G01S 5/0294; H04W 64/00
USPC ............ 701/23, 26, 408, 411, 416, 434, 467, 701/469, 409; 345/641; 455/456.1
See application file for complete search history.

(56) References Cited

U.S. PATENT DOCUMENTS 5,898,680 A 4/1999 Johnstone et al.
6,477,515 B1 * 11/2002 Boroujerdi et al. ............. 706/14
(Continued)

FOREIGN PATENT DOCUMENTS

DE 102006056338 A1 6/2008
EP 2148167 A2 1/2010
(Continued)

OTHER PUBLICATIONS

Bandera A et al., "An Hierarchical Approach to Grid-Based and Topological Maps Integration for Autonomous Indoor Navigation", Proceedings of the 2001 IEEE/RSJ International Conference on Intelligent Robots and Systems, (IROS 2001). Maui, Hawaii, Oct. 29-Nov. 3, 2001, [IEEE/RSJ Internations Conference on Intelligent Robots and Systems], New York, NY: IEEE, US, vol. 2, Oct. 10, 2001, pp. 883-888, XP010571808, DOI: 10.1109/IROS.2001.976280 ISBN: 978-0-7803-6612-1 col. 2-8.

(Continued)

Primary Examiner — Gertrude Arthur Jeanglaude
(74) Attorney, Agent, or Firm — Berkeley Law & Technology Group, LLP

(57) ABSTRACT

The subject matter disclosed herein may relate to methods, apparatuses, systems, devices or articles for generating or using an indoor likelihood heatmap, etc. For certain example implementations, a method for a device may comprise projecting multiple grid points over a schematic map of an indoor area, with the schematic map indicating multiple obstructions of the indoor area. Feasible paths between grid point pairs of the multiple grid points may be determined. For a particular grid point of the multiple grid points, a count of the feasible paths that traverse the particular grid point may be determined. A likelihood heatmap for use in one or more navigational applications may be generated based, at least in part, on the count. Other example implementations are described herein.

56 Claims, 12 Drawing Sheets

(56) References Cited

U.S. PATENT DOCUMENTS

| | | | |
|---|---|---|---|
| 6,545,288 | B1 | 4/2003 | Ratchkov et al. |
| 7,440,447 | B2 * | 10/2008 | Kareev et al. ............... 370/359 |
| 7,532,113 | B2 | 5/2009 | Krumm |
| 7,616,156 | B2 | 11/2009 | Smith et al. |
| 7,881,720 | B2 | 2/2011 | Huang et al. |
| 7,953,551 | B2 * | 5/2011 | Park et al. ................... 701/416 |
| 2003/0063589 | A1 | 4/2003 | Haines et al. |
| 2003/0214410 | A1 | 11/2003 | Johnson et al. |
| 2006/0087425 | A1 | 4/2006 | Haeberlen |
| 2006/0149465 | A1 | 7/2006 | Park et al. |
| 2007/0149215 | A1 | 6/2007 | Misikangas |
| 2007/0250373 | A1 | 10/2007 | Ernest et al. |
| 2009/0043504 | A1 | 2/2009 | Bandyopadhyay et al. |
| 2009/0054043 | A1 | 2/2009 | Hamilton et al. |
| 2010/0023249 | A1 | 1/2010 | Mays et al. |
| 2010/0117889 | A1 | 5/2010 | Grube |
| 2010/0210013 | A1 | 8/2010 | Mistry et al. |
| 2010/0250727 | A1 | 9/2010 | King et al. |
| 2010/0255856 | A1 | 10/2010 | Kansal et al. |
| 2010/0287178 | A1 | 11/2010 | Lambert et al. |
| 2011/0090123 | A1 | 4/2011 | Sridhara et al. |
| 2011/0218992 | A1 | 9/2011 | Waldman et al. |
| 2012/0021771 | A1 | 1/2012 | Gupta et al. |
| 2013/0267251 | A1 | 10/2013 | Khorashadi |

FOREIGN PATENT DOCUMENTS

| | | |
|---|---|---|
| GB | 2481851 A | 1/2012 |
| WO | 2011091173 A1 | 7/2011 |

OTHER PUBLICATIONS

Fernando Lyardet, et al., "CoINS: Context Sensitive Indoor Navigation System", Multimedia, 2006. ISM'06. Eighth IEEE International Symposium on, IEEE, PI, Dec. 1, 2006, pp. 209-218, XP031041784, ISBN: 978-0-7695-2746-8 p. 1, right-hand column p. 2, right-hand column—p. 6, left-hand column.

Soltani A R, et al., "A fuzzy based multi-objective path planning of construction sites", Automation in Construction, Elsevier Science Publishers, Amsterdam, NL, vol. 13, No. 6, Nov. 1, 2004, pp. 717-734.

XP004543997, ISSN: 0926-5805, DOI: DOI:10.1016/J.AUTCON. 2004.04.012 p. 719, left-hand column, paragraph 2 p. 720—p. 721 p. 723, right-hand column p. 725, right-hand column—p. 727 figures 1-3,5,7,10,14.

Written Opinion—PCT/US2011/043660, ISA/EPO—Oct. 20, 2011.

John T. Stasko; Erich P. Stuntebeck; Yi Han; Gregory D. Abowd, "A Visual Analytics System for Radio Frequency Fingerprinting-based Localization" School of Interactive Computing & GVU Center, Georgia Institute of Technology, (2009) pp. 1-8.

Wu, Ha et al., "Path planning and following algorithms in an indoor navigation model for visually impaired" School of Electronics, Electrical Engineering and Computer Sciense, Queen's University of Belfast, Northern Ireland, UK, BT9 5HN, Second International Conference on Internet Monitoring and Protection (ICIMP 2007), pp. 1-7.

U.S. Appl. No. 13/180,153, filed Jul. 11, 2011, 59 pages.

U.S. Appl. No. 13/180,153: Notice to file missing parts and filing receipt, mailed Jul. 25, 2011, 5 pages.

PCT/US11/043660: PCT application as filed on Jul. 12, 2011, 69 pages.

Kolodziej, J., et al., "Utilization of Markov Model and Non-Parametric Belief Propagation for Activity-Based Indoor Mobility Prediction in Wireless Networks", Complex, Intelligent and Software Intensive Systems (CISIS), 2011 International Conference on, IEEE, Jun. 30, 2011, pp. 513-518, XP032036561, DOI: 10.1109/CISIS.2011.84 ISBN: 978-1-61284-709-2.

* cited by examiner

INDOOR LIKELIHOOD HEATMAP

CLAIM OF PRIORITY UNDER 35 U.S.C. §119

This application claims priority under 35 USC §119 to U.S. Provisional Application Ser. No. 61/363,984, filed 13 Jul. 2010, and entitled "Movement Heatmap," which is assigned to the assignee hereof and which is incorporated herein by reference.

CROSS REFERENCE TO RELATED APPLICATIONS

The subject matter disclosed herein relates to U.S. patent application Ser. No. 13/180,153, titled "Methods and Apparatuses for Use in Generating an Encoded Routeability Graph Description," assigned to the assignee of the present application and filed on the same day as the present application, and U.S. Provisional Application No. 61/363,980, filed Jul. 13, 2010, and titled, "Map Reduction," assigned to the assignee of the present application.

BACKGROUND

1. Field

The subject matter disclosed herein relates to an indoor likelihood heatmap and more specifically, but by way of example only, to generating or using an indoor likelihood heatmap in conjunction with movement within an indoor area.

2. Information

Paper maps have been used by people for hundreds, if not thousands of years, to aid navigation in unfamiliar or foreign territories. Electronic maps began to be available during the twentieth century. With the advent of the Internet, people could electronically access maps of many places from all over the globe. Web-based mapping services could also provide directions from one point to another point. These directions from web-based mapping services were originally relatively static. With the invention of satellite-positioning system (SPS) technology and ever-smaller electronic devices, however, so-called turn-by-turn directions could be provided dynamically as travelers journeyed toward their destination.

Electronic maps, web-based mapping services, and turn-by-turn directions focus on providing navigational aids in certain situations and in particular environments. Unfortunately, there are other situations or different environments for which they are not intended or have not been designed. Consequently, there remain a number of situations, environments, etc. in which navigational or other location-based services may be improved.

BRIEF DESCRIPTION OF THE FIGURES

Non-limiting and non-exhaustive aspects, features, etc. will be described with reference to the following figures, wherein like reference numerals may refer to like parts throughout the various figures.

SUMMARY

Figure 1:
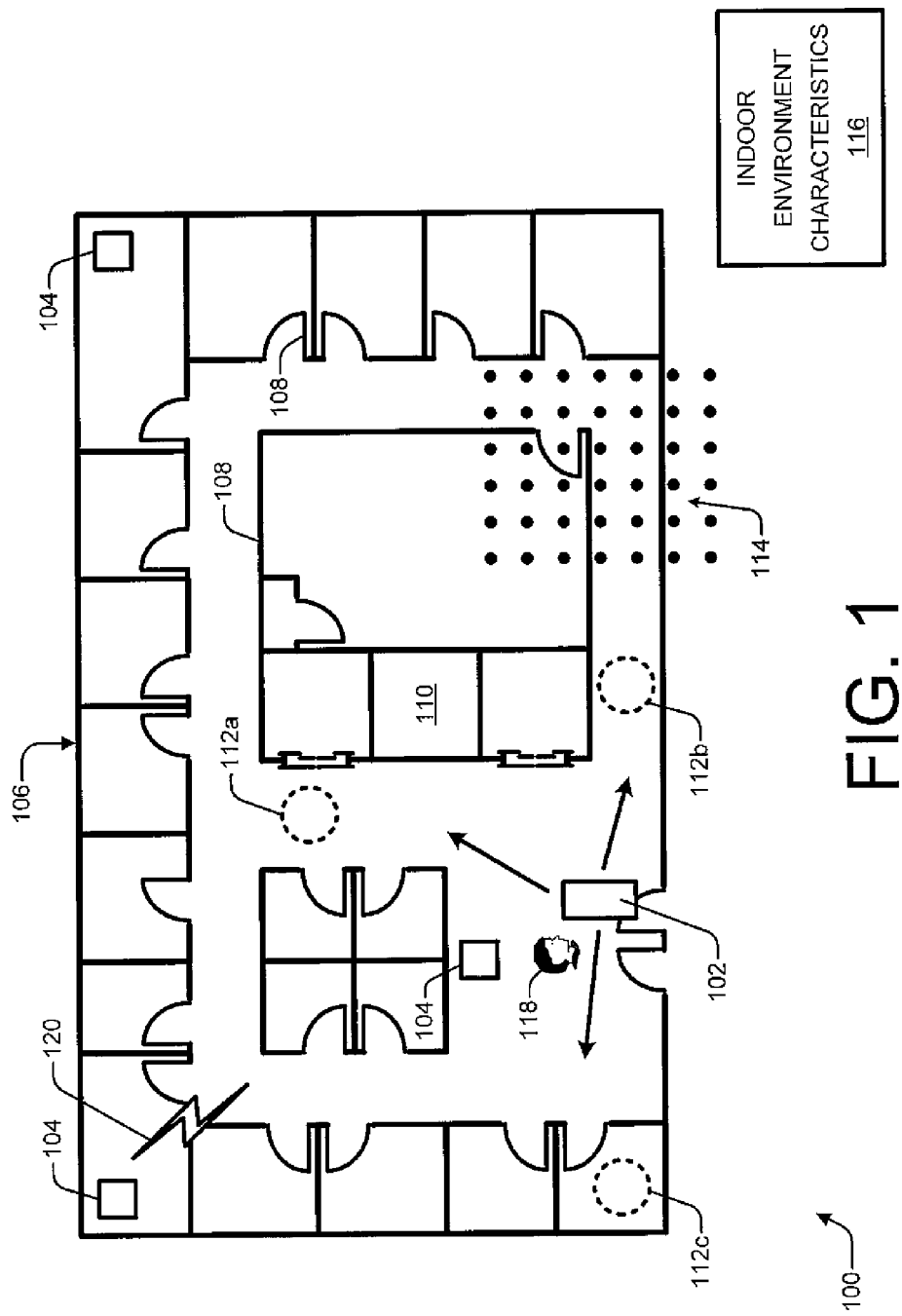
FIG. 1 depicts an example indoor area, which may be represented by a schematic map over which a likelihood heatmap is projected, in which a mobile device may travel according to an implementation.

For certain example implementations, a method for a device may comprise: projecting multiple grid points over a schematic map of an indoor area, said schematic map indicating multiple obstructions of said indoor area; determining feasible paths between grid point pairs of said multiple grid points; determining for a particular grid point of said multiple grid points a count of said feasible paths that traverse said particular grid point; and generating a likelihood heatmap for use in one or more navigational applications based, at least in part, on said count. For certain example implementations, a device for generating a likelihood heatmap may comprise: at least one memory to store instructions; and one or more processors to execute said instructions to: project multiple grid points over a schematic map of an indoor area, said schematic map indicating multiple obstructions of said indoor area; determine feasible paths between grid point pairs of said multiple grid points; determine for a particular grid point of said multiple grid points a count of said feasible paths that traverse said particular grid point; and generate said likelihood heatmap for use in one or more navigational applications based, at least in part, on said count. For certain example implementations, a device for generating a likelihood heatmap may comprise: means for projecting multiple grid points over a schematic map of an indoor area, said schematic map indicating multiple obstructions of said indoor area; means for determining feasible paths between grid point pairs of said multiple grid points; means for determining for a particular grid point of said multiple grid points a count of said feasible paths that traverse said particular grid point; and means for generating said likelihood heatmap for use in one or more navigational applications based, at least in part, on said count. For certain example implementations, an article may comprise: at least one storage medium having stored thereon instructions executable by one or more processors to: project multiple grid points over a schematic map of an indoor area, said schematic map indicating multiple obstructions of said indoor area; determine feasible paths between grid point pairs of said multiple grid points; determine for a particular grid point of said multiple grid points a count of said feasible paths that traverse said particular grid point; and generate a likelihood heatmap for use in one or more navigational applications based, at least in part, on said count. It should be appreciated, however, that these are merely example implementations and that other implementations are described herein and may be implemented without departing from claimed subject matter.

For certain example implementations, a method may comprise: obtaining a likelihood heatmap for an indoor area that includes multiple obstructions, said likelihood heatmap corresponding to a schematic map of said indoor area and including multiple grid points, wherein likelihood values that are indicated for individual grid points of said multiple grid points are based at least partly on counts of feasible paths between grid point pairs that traverse said individual grid points; and determining an estimated location of a mobile device within said indoor area based, at least in part, on said likelihood heatmap. For certain example implementations, a mobile device for using a likelihood heatmap may comprise: at least one memory to store instructions; and one or more processors to execute said instructions to: obtain said likelihood heatmap for an indoor area that includes multiple obstructions, said likelihood heatmap corresponding to a schematic map of said indoor area and including multiple grid points, wherein likelihood values that are indicated for individual grid points of said multiple grid points are based at least partly on counts of feasible paths between grid point pairs that traverse said individual grid points; and determine an estimated location of said mobile device within said indoor area based, at least in part, on said likelihood heatmap. For certain example implementations, a mobile device for using a likelihood heatmap may comprise: means for obtaining said likelihood heatmap for an indoor area that includes multiple obstructions, said likelihood heatmap corresponding to a schematic map of said indoor area and including multiple grid points, wherein likelihood values that are indicated for individual grid points of said multiple grid points are based at least partly on counts of feasible paths between grid point pairs that traverse said individual grid points; and means for determining an estimated location of said mobile device within said indoor area based, at least in part, on said likelihood heatmap. For certain example implementations, an article may comprise: at least one storage medium having stored thereon instructions executable by one or more processors to: obtain a likelihood heatmap for an indoor area that includes multiple obstructions, said likelihood heatmap corresponding to a schematic map of said indoor area and including multiple grid points, wherein likelihood values that are indicated for individual grid points of said multiple grid points are based at least partly on counts of feasible paths between grid point pairs that traverse said individual grid points; and determine an estimated location of a mobile device within said indoor area based, at least in part, on said likelihood heatmap. It should be appreciated, however, that these are merely example implementations and that other implementations are described herein and may be implemented without departing from claimed subject matter.

DETAILED DESCRIPTION

Reference throughout this Specification to "a feature," "one feature," "an example," "one example," and so forth means that a particular feature, structure, characteristic, or aspect, etc. that is described in connection with a feature or example may be relevant to at least one feature or example of claimed subject matter. Thus, appearances of a phrase such as "in one example," "for example," "in one feature," "a feature," "a particular feature," "in an example implementation," or "for certain example implementations," etc. in various places throughout this Specification are not necessarily all referring to the same feature, example, or example implementation. Furthermore, particular features, examples, structures, characteristics, or aspects, etc. may be combined in one or more example devices, example methods, example apparatuses, or other example implementations.

Navigational or other location-based services may rely at least partially on determining at least an estimated position of a mobile device. However, positioning strategies that are effective in outdoor environments, which may utilize satellite positioning system (SPS) signals or satellite imagery, may be inadequate for indoor environments. Thus, as is explained further herein below, performing a positioning operation indoors to estimate a location of a mobile device may involve different techniques or strategies as compared to those that may be used outdoors. Within indoor environments, mobile devices may attempt to effectuate indoor positioning at least partly by processing signals transmitted from transmitters (e.g., wireless transmitter devices) that are located, for example, within an indoor environment at known locations. Examples of transmitters may include, but are not limited to, wireless transmitter devices that comport with a Wi-Fi access point protocol (e.g., IEEE 802.11), a Bluetooth protocol, a femtocell protocol, or any combination thereof, etc.

As a user travels within an indoor area while carrying a mobile device, position estimates of the mobile device may be at least partially determined using, for example, one or more signals transmitted from at least one transmitter. A mobile device may measure characteristics of signals received from one or more transmitters. Such characteristics may include, but are not limited to, received signal strength indicator or indication (RSSI) measurements, round trip time (RTT) measurements, round trip delay (RTD) measurements, time of arrival (TOA) measurements, angle of arrival (AOA) measurements, or combinations thereof, etc. Using measurements of received wireless signals along with techniques that are known in the art (e.g., trilateration), a location of a mobile device may be estimated. With trilateration, for example, a mobile device may use well known techniques to obtain a position fix from ranges to multiple transmitters that are positioned at known locations. Ranges to transmitters may be measured based, at least in part, on received wireless signal characteristics (e.g., RSSI, RTT, RTD, TOA, or AOA, etc.).

Wireless signal reception measurements with one or more transmitters may enable estimation of a location of a mobile device or may aid in refining an estimated location. Unfortunately, wireless signal reception measurements may be costly in terms of energy usage, latency, or computational complexity, for example. Furthermore, no transmitters or an insufficient number of transmitters may be in communication range with a mobile device at any given moment. Hence, other mechanisms for determining an estimated location, which may not entail measuring a characteristic of a received signal, may additionally or alternatively be employed.

Indirect mechanisms that may be used to determine an estimated location may comprise, by way of example but not limitation, indirect measurements, predictive procedures, mobility models, or any combinations thereof, etc. For example, a movement model may indicate a possible or likely movement pattern of a mobile device. Implementation of a movement model may include application of positional filtering, consideration of a likely speed of perambulation (e.g., a reasonable or maximum walking speed), or applying a smoothing procedure to a traveled path, etc., just to name a few examples. Other indirect mechanisms may indicate, for example, relative positional movement of a mobile device. Relative positional movement may be determined using one or more indirect measurements. Indirect measurements may be obtained from, by way of example only, one or more inertial sensors such as accelerometer(s), pedometer(s), compass(es), gyroscope(s), or any combination thereof, etc. Additionally or alternatively, determination of a relative positional movement may use, by way of example only, at least one mobility model that considers average or maximum velocity of a pedestrian, a previous location, a previous velocity (e.g., a previous speed or a previous direction of travel, etc.), one or more probabilistic mechanisms, a path smoothing procedure, a path filtering procedure, or any combination thereof, etc.

Determination of location estimates of a mobile device or a trajectory or a path of a mobile device within an indoor area may be enabled or enhanced using one or more probabilistic mechanisms. By way of example but not limitation, a position of a mobile device may be represented as a probability distribution. A probability distribution may comprise, by way of example but not limitation, a range of possible values that a random variable may take, a probability that a value of a random variable falls within an e.g. measurable subset of a range of possible values, or any combination thereof, etc. To model a mobile device's movement within a physical indoor area, a probability distribution may be propagated around a schematic map modeling or representing the physical indoor area. To implement a probabilistic mechanism, a Bayesian or smoothing filter may be applied to location estimates or a process of determining location estimates. Implementation of a probabilistic mechanism may include consideration of a current location or trajectory of a mobile device. Additionally or alternatively, a Kalman filter or a particle filter may be applied to location estimates or a process of determining location estimates. Other probabilistic mechanisms may additionally or alternatively be implemented without departing from claimed subject matter.

With a particle filtering implementation, by way of example only, a mobile device's location(s) or estimated locations may be represented by multiple particles. Each particle may represent a possible state or location of a mobile device. A combination of multiple particles (e.g., an average, a centroid, a mean, etc. with an error or confidence range that is derived from a combination of multiple particles) of a particle cloud may be considered at least one estimated location of a mobile device. Additionally or alternatively, one or more individual particles of multiple particles of a particle cloud may be considered at least one estimated location of a mobile device. In response to movement of a mobile device, particles may be propagated according to a probability distribution. Particles may be propagated in accordance with a probability distribution further along a corridor, around a corner, by branching at an intersection, by taking a portal (e.g., a stairway, an escalator, an elevator, etc.) to a different floor, or any combination thereof, etc.

Particle filtering may therefore be used as an indirect mechanism to determine or refine an estimated location of a mobile device. With particle filtering, potential locations of a mobile device may be represented by particles in a particle cloud that are propagated using a probabilistic model. If a position fix is made for a mobile device at a given position, multiple particles may be propagated away from the given position in accordance with one or more parameters. A user may continue along a current trajectory, veer off leftward or rightward, make a left or a right turn, cease movement, reverse direction, or make some other movement. A particle may be assigned to represent each of these possible user movements. For instance, if a user is approaching an intersection where one of two possible hallways may be taken, particles of a particle cloud may split into two particle clusters at two different positions, with a first particle cluster propagating down a first hallway and a second particle cluster propagating down a second hallway. Some example implementations are described herein in terms of particle filtering. However, claimed subject matter is not limited to particle filtering or any particular examples of particle filtering.

A user carrying a mobile device may travel within an indoor environment. To provide to a user of a mobile device a location-based service via a navigational application, an estimated position of a mobile device within an indoor environment may be determined by a positioning engine of the mobile device. An indoor environment may be envisioned as having a grid of points projected or laid over it. A grid of points may have any number of points that are sufficient to cover an indoor area or provide a desired level of granularity or precision. Adjacent points of a grid of points may be spaced apart at six inch increments, one foot increments, one-and-a-half foot increments, or three foot increments, etc., just to name a few examples.

A current estimated location of a mobile device may be estimated, for example, via a position fix attained using one or more range determinations with one or more transmitters as is described above. A current estimated location of a mobile device may correspond to a determined point of a grid of points. From a determined point, a number of particles may be established and permitted to move around an indoor area based on one or more conditions or properties for a current epoch that extends for a given duration of time. By way of example only, hundreds of particles may be propagated for two to four seconds per epoch. Absent other indications, a likelihood that one or more particles are to move to any given point of a set of adjacent or equally-proximate points may be equal. However, given a layout of an indoor area, it may become apparent that a mobile device is actually more likely to be located at or moving to some points as compared to other points.

Indoor areas, such as office buildings or malls, may include hallways and rooms, for example. In an office environment, rooms may include common rooms (e.g., a break room, a conference room, etc.) or individuals' rooms (e.g., a personal office, a cubicle, etc.). In such an office environment, a likelihood that a person is to move to a given point during a current epoch may depend, at least in part, on whether a given point is located within a hallway, a common room, or an individual's room. For example, users may generally be more likely to be traveling in a hallway than in a common room or more likely to be traveling in a common room than in an individual's room. Consequently, there may be a greater likelihood that a mobile device starting at a particular point of a grid of points is moving to a first point that is within a hallway than is moving to a second point that is within an individual's room.

Particles that are being propagated from one point to other points may be more accurately propagated if likelihoods of where mobile devices are likely to be traveling or likely to be positioned are taken into consideration by e.g. a particle filtering process of a positioning engine of a mobile device. A likelihood heatmap for an indoor area may indicate respective likelihood values for respective points of a grid of points that is laid over an indoor area. Likelihood values of a likelihood heatmap may indicate relative likelihoods that a mobile device is to be positioned at one point as compared to other points or is to move to a next point from a current point. Particles may be propagated during a current epoch according to a likelihood heatmap to determine where individual particles are likely to be when the current epoch expires.

As described further herein below, an indoor likelihood heatmap may be pre-computed based, at least in part, on one or more features of an indoor area, such as walls, doors, hallways, rooms, or any combination thereof, etc. For certain example implementations, relative likelihoods for different points of a grid of points may be generated based, at least in part, on feasible paths between grid point pairs of the grid of points. Feasible paths between grid point pairs may comprise those paths extending between a first point and a second point that do not pass through an obstruction, such as a wall, of an indoor area. For a particular grid point of a grid of points, a likelihood value may be determined based, at least in part, on a count of feasible paths that traverse the particular grid point. Examples of grids of points, connectivity graphs that are defined on grids of points, and feasible paths that are drawn on connectivity graphs are described further herein below with particular reference to at least FIG. 2.

To generate a likelihood heatmap having a desired level of resolution, a connectivity graph may be laid over a schematic map of an indoor area, with the connectivity graph having the desired level of resolution. Such a connectivity graph may be considered a dense connectivity graph. In contrast, a sparse connectivity graph may include, by way of example but not limitation, multiple grid points that are located at positions through which a user of a mobile device is expected to be likely to travel. For instance, grid points along a center of a hallway are more likely than grid points that "hug" a wall of a hallway. For certain example implementations, shortest feasible paths between grid point pairs may be constrained to traverse grid points of a sparse connectivity graph so that a likelihood heatmap may be generated that reflects a higher likelihood that mobile devices are positioned, for instance, along a central region of a hallway. It should be understood that claimed subject matter is not limited to any of these particular example implementations. Moreover, additional example implementations for generating or using indoor likelihood heatmaps are described further herein below.

FIG. 1 depicts an example indoor area 100, which may be represented by a schematic map over which a likelihood heatmap is projected, in which a mobile device may travel according to an implementation. Indoor area 100 may be represented by a schematic map 106 over which a likelihood heatmap 114 may be projected. At least one user 118 that is associated with at least one mobile device 102 may be present within indoor area 100. As illustrated, schematic map 106 may indicate one or more transmitters 104, one or more obstructions 108, or at least one infeasible area 110. Multiple potential positions 112a, 112b, or 112c may also be shown or reflected on schematic map 106. An indoor area 100 may be associated with or modeled using indoor environment characteristics 116.

For certain example implementations, indoor areas may comprise one or more indoor environments such as office buildings, shopping malls, airports, apartment buildings, arenas, convention centers, auditoriums, amphitheatres, warehouses, classroom buildings or schools, supermarkets, stadiums, a transit station terminal, a library, one or more floors thereof, interiors of other structures, or any combination thereof, just to name a few examples. In example implementations, indoor environment characteristics 116 may be descriptive of an indoor area 100 or may facilitate provision of a location-based service in conjunction with mobile devices that are located within a corresponding indoor area 100. By way of example but not limitation, indoor environment characteristics 116 may include at least a portion of one or more of any of the following: a schematic map (e.g., a schematic map 106) of an indoor area, a connectivity graph (e.g., for a schematic map), a routability graph (e.g., for a schematic map), annotations (e.g., for a schematic map), a heatmap (e.g., a likelihood heatmap 114), transmitter characteristics (e.g., characteristics of transmitters 104), identities of transmitters, points of interest for an indoor area, navigational instructions, at least one mobility model, or any combination thereof, etc. Additional description and examples of indoor environment characteristics 116, such as a schematic map, a connectivity graph, or a heatmap, etc., are described herein below with particular reference to at least FIG. 1 or 2.

In example implementations, an indoor area 100 may include one or more obstructions 108, such as a wall or a door. Obstructions 108 may include, but are not limited to, walls, doors, railings, columns, or barriers; furniture or cubicle dividers; or any combination thereof; etc. For the sake of visual clarity in FIG. 1, two obstructions 108 are specifically indicated by reference number; however, many obstructions are actually depicted. Obstructions 108 may exist in the physical world and may have corresponding representation(s) included as part of a schematic map 106 of an indoor area 100. Although claimed subject matter is not so limited, obstructions 108 may thus include building features or other objects that may restrict movement around an indoor environment. Indoor environments may also have open spaces such as lobbies, common areas, entryways, or rooms, etc., just to name a few examples. Accordingly, because paths of movement in such an indoor environment may be restricted in some areas (although they may also be unrestricted in other, open spaces), an indoor environment may comprise an example of a constrained environment.

In example implementations or as depicted in FIG. 1, an indoor area 100 may be represented by a schematic map 106. A schematic map may comprise, by way of example only, indications of one or more features that are descriptive of at least one indoor area. Features of a schematic map may represent, by way of example but not limitation, attributes of a physical layout or a physical organization of at least one indoor area. For example, features of a map may indicate locations, lengths, or sizes, etc. of walls, rooms, doors, entryways, hallways, passageways, corridors, dividers, railings, portals between floors, obstructions, or any combination thereof, etc., just to name a few examples. A schematic map 106 may further include one or more indications of one or more infeasible areas 110. An infeasible area 110 may comprise, by way of example but not limitation, an area to which a person does not appear to normally have access, such as an enclosed area without a door. For instance, there may be no door for infeasible area 110 because it represents space for elevator machinery. As another instance, a space on a second floor that is open to a first floor below may be indicated to be infeasible on the second floor (e.g., even if a corresponding space on the first floor is indicated to be feasible). In contrast, a feasible area may comprise a space to which a person does appear to have access, such as a room having a doorway.

As indicated above, indoor environment characteristics 116 may include transmitter characteristics. An example of transmitter characteristics may include, but is not limited to, a position of one or more transmitters 104. To provide positions of one or more transmitters 104 for indoor environment characteristics 116, a schematic map 106 may also include representations of transmitters 104 or indications of positions thereof. Additionally or alternatively, one or more transmitters 104 may be linked to one or more locations on a schematic map 106. A schematic map 106 for an indoor area 100 may be used to facilitate navigation or mobile device positioning within an indoor environment, for example. However, claimed subject matter is not limited to any particular example aspects of a schematic map or indoor environment characteristics 116.

For certain example implementations, a user 118 may travel in an indoor area 100 while carrying a mobile device 102. Mobile device 102 is illustrated at an entryway of indoor area 100. User 118 may proceed in any of many possible directions as represented by three arrows that indicate three example directions. A mobile device 102 may communicate via one or more wireless signals 120 with a transmitter 104 from time to time. A signal 120 may be, for example, transmitted from a mobile device 102 and received at a transmitter 104 or transmitted from a transmitter 104 and received at a mobile device 102. Although only one mobile device 102 or three transmitters 104 are explicitly shown in FIG. 1, more or less of either or both may alternatively be involved in a given implementation without departing from claimed subject matter. Furthermore, example implementations may include a server device (not shown in FIG. 1). Example realizations for a server device, as well as additional server device examples, are described herein below with particular reference to at least FIG. 12. However, claimed subject matter is not limited to any particular type, size, category, capability, etc. of a server device.

Examples of a mobile device 102 may include, but are not limited to, a mobile phone, a mobile station, user equipment, a smart phone, a cellular phone, a netbook, a laptop computer, a notebook computer, a tablet computer, a slate computer, a personal digital assistant (PDA), a personal navigation device (PND), an entertainment appliance, an e-book reader, or some combination thereof, etc., just to name a few examples. Furthermore, a mobile device 102 may comprise any mobile device with wireless communication capabilities. Example realizations for a mobile device, as well as additional mobile device examples, are described herein below with particular reference to at least FIG. 13. However, claimed subject matter is not limited to any particular type, size, category, capability, etc. of a mobile device.

In example implementations, a transmitter 104 may comprise a Wi-Fi or wireless local area network (WLAN) access point (AP), a femtocell nodal device, a WiMAX nodal device, an indoor location beacon, a Bluetooth or other similarly short-ranged wireless node, or any combination thereof, etc., just to name a few examples. A transmitter 104 may transmit signals 120 including, but not limited to, those that are capable of identifying a particular wireless access device or those that may be useful for estimating a position of a mobile device. A mobile device 102 may be within wireless communication range of one or more transmitters 104 or in wireless communication with one or more transmitters 104. A transmitter 104 may also be capable of receiving wireless signals 120 or may comprise a wireless access device generally that is capable of both transmitting and receiving wireless signals 120. A transmitter 104 may be located such that it corresponds to or is capable of communicating with mobile devices that are within a particular indoor area 100, such as a particular floor of a building.

During wireless communication(s), signals 120 that are received at a mobile device 102 from a particular transmitter 104 may be modulated with a unique device identifier that identifies the particular transmitter 104. For a Wi-Fi AP implementation of a transmitter 104, by way of example but not limitation, a unique device identifier may comprise an AP medium access control identifier (MAC ID). A transmitter 104 may further interact with a mobile device 102 so as to enable signal reception measurements to be performed by a mobile device 102. Signal reception measurements may include, but are not limited to, RSSI measurements, RTT measurements, RTD measurements, TOA measurements, AOA measurements, or any combination thereof, etc.

As a mobile device 102 travels within an indoor area 100, position estimates of mobile device 102 may be determined using, for example, signals 120 received from one or more transmitters 104 that are positioned at known locations of indoor area 100. For example, a range between a mobile device and a transmitter may be estimated using one or more signal characteristics, such as RSSI, RTT, RTD, TOA, AOA, or any combinations thereof, etc. Measuring a range to a transmitter having a known location may enable a mobile device to estimate its location within an indoor area along a circle, or portion thereof (e.g., an arc), having a center where the transmitter is located. By acquiring a unique device identifier that is modulated in a signal from a transmitter having a known location, a mobile device may at least measure a range to the transmitter. Measurement of a range to a transmitter having a known location with respect to an indoor area may be used to refine an estimated location (e.g., a likely position). Additionally or alternatively, a mobile device may measure one or more ranges to one or more transmitters to estimate its location. Using measurements from at least three transmitters along with techniques that are known in the art (e.g., trilateration), a position of a mobile device may be estimated by combining three or more range measurements. In other words, with trilateration for example, a mobile device may utilize well known techniques to obtain a position fix using ranges to transmitters at known locations with ranges determined at least partly from received wireless signal characteristics (e.g., RSSI, RTT, RTD, TOA, AOA, etc.).

Additionally or alternatively, a mobile device may obtain a position fix based, at least in part, on a comparison of received wireless signal characteristics (e.g., RSSI, RTT, RTD, TOA, AOA, etc.) to one or more values of a heatmap. A signal characteristic heatmap may indicate one or more received wireless signal characteristic values that correspond to a given position within an indoor environment. If a mobile device acquires at least one signal having characteristic(s) that match wireless signal characteristic value(s) that correspond to a given position as indicated by a heatmap, then the mobile device may infer that it is located at the given position. If estimated locations are being determined from wireless signal characteristic value(s), for example, such estimated locations may be adjusted or refined using a likelihood heatmap 114.

For certain example implementations, a heatmap, such as likelihood heatmap 114, may be laid over or projected onto a schematic map 106. A heatmap, by way of example but not limitation, may comprise or indicate one or more values that correspond to one or more positions of an indoor area. In example implementations, heatmap values may comprise location likelihood values that indicate relative likelihoods (e.g., relative probabilities) that a mobile device may be located at one position of an indoor area as compared to other positions of the indoor area. A likelihood value may comprise a single number, a numerical range, a probabilistic range (e.g., a mean plus a standard deviation), or any combination thereof, etc., just to name a few examples.

In example implementations, a heatmap may include a map of an indoor area 100 to which it corresponds. Additionally or alternatively, a heatmap may reference positions that are defined or otherwise specified in a map that is included as part of, e.g., a schematic map 106. For the sake of visual clarity in FIG. 1, only a portion of likelihood heatmap 114 is shown; a heatmap may actually cover less or more (e.g., an entirety) of an indoor area 100. Also, as shown in FIG. 1 merely for purposes of illustration, a heatmap, such as a likelihood heatmap 114, may comprise multiple discrete points that are organized in a grid or other arrangement. Additionally or alternatively, a heatmap, such as a likelihood heatmap 114, may comprise likelihood values that indicate or are determined based, at least partly, on a continuous positional basis or may comprise contours defined by likelihood values or likelihood value ranges. However, claimed subject matter is not limited to any particular implementation of a likelihood heatmap.

In an example scenario, if a user 118 enters indoor area 100 with mobile device 102, user 118 may travel in any of a number of potential directions. Three example directions are shown by three arrows pointing away from mobile device 102. These three example directions may lead respectively to three potential positions 112*a*, 112*b*, or 112*c*. Although it may appear at first that a mobile device 102 is equally likely to be located at or moving towards each potential position 112*a*, 112*b*, or 112*c* (or any given position of indoor area 100), this may not be the case due at least partially to an organizational layout or due to building features of indoor area 100. For example, as explained herein above, a general user 118 may be more likely to be positioned in a hallway than in a particular room, or a general user 118 may be more likely to be positioned in a common room than in an individual's room.

With reference to FIG. 1 specifically, potential position 112*a* may be located outside an elevator bank that may lead to multiple other floors of a multi-floor building in which indoor area 100 may correspond to a first floor, for example. Potential position 112*b* may be located along a hallway that leads to multiple other individual offices. Potential position 112*c* may be located within a single individual office. Consequently, a user 118 (e.g., a general user that is not an occupant of the single individual office) may be less likely to be heading towards or located at potential position 112*c* as compared to potential position 112*b* or potential position 112*a*. Similarly, if it were given that the entrance to a building is on a first floor as represented by indoor area 100 and that each of multiple other floors have multiple individual offices, a user 118 (e.g., a general user that is not the occupant of an individual office of the first floor of indoor area 100) may be less likely to be heading towards or located at potential position 112*b* as compared to potential position 112*a*, which is adjacent to an elevator that provides access to other floors.

A likelihood heatmap 114 may provide indications of relative likelihoods that a mobile device is located at one position as compared to other positions of indoor area 100. For certain example implementations as described herein, determination of a likelihood heatmap 114 for an indoor area 100 may be based, at least in part, on a schematic map 106. By way of example only, natural traffic patterns due to an organizational layout of indoor area 100 may be taken into consideration. Additionally or alternatively, natural walking paths due to building features of indoor area 100 may be taken into consideration. For instance, there may be more user traffic through centers of hallways than along edges of hallways. Similarly, there may be more user traffic through centers of rooms than in corners of rooms. Example implementations for generating or using likelihood heatmaps are described further herein below.

Figure 2:
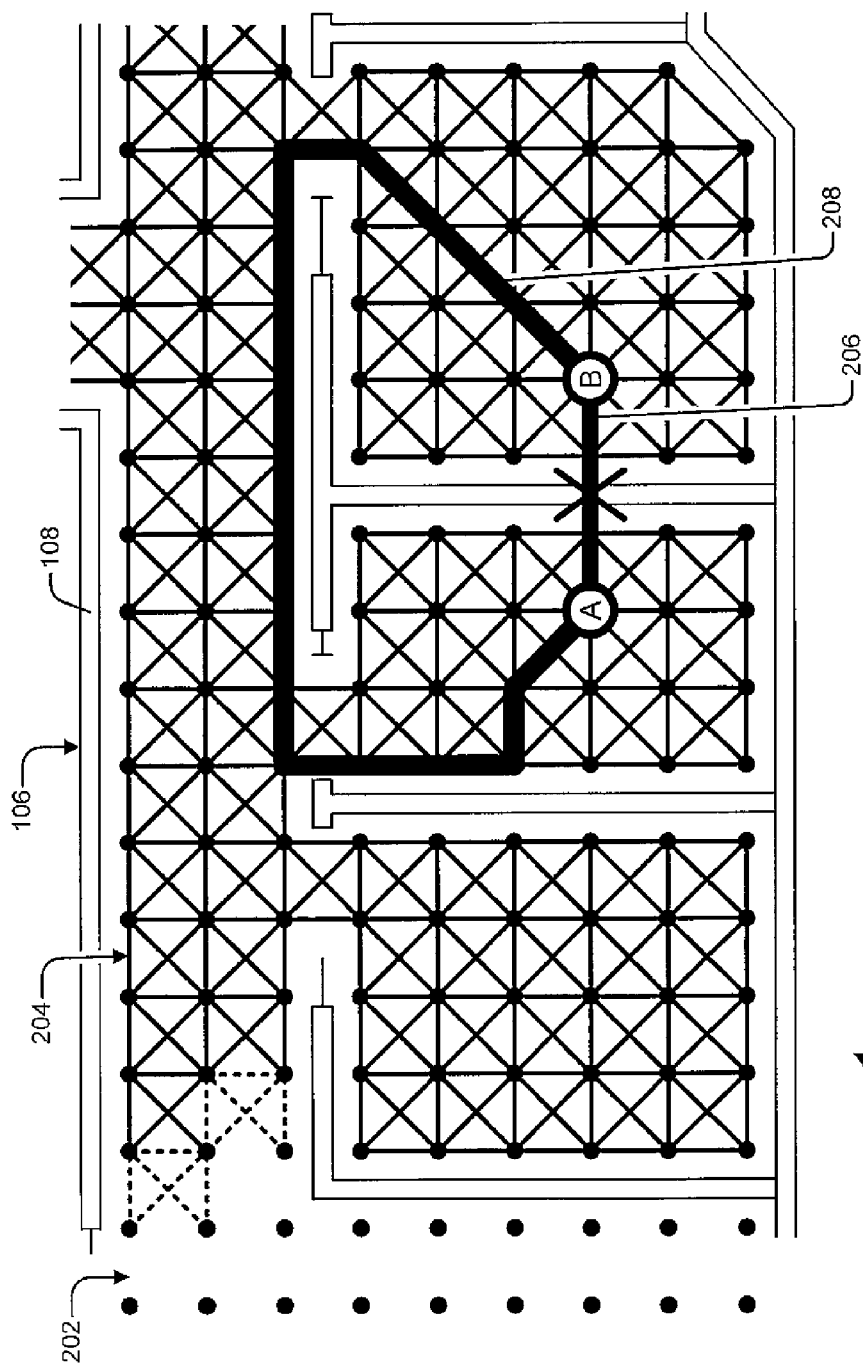
FIG. 2 is a schematic diagram that illustrates an example connectivity graph for an indoor area that may indicate feasible or infeasible paths according to an implementation.

FIG. 2 is a schematic diagram 200 that illustrates an example grid of points or an example connectivity graph for an indoor area that may indicate feasible or infeasible paths according to an implementation. An indoor area may include one or more obstructions 108 as indicated by a corresponding schematic map 106. As illustrated, schematic diagram 200 may include a grid of points 202, a connectivity graph 204, an infeasible path 206, or a feasible path 208. Points "A" and "B" are also indicated in FIG. 2.

For certain example implementations, a grid of points 202 may be projected over a schematic map 106 of an indoor area. A grid of points may, by way of example but not limitation, comprise multiple points that are spaced apart by a given distance. A given distance may be adjusted to meet a desired level of resolution or granularity. Multiple points of a grid of points may be interconnected by lines. Generally, a graph may comprise multiple nodes that are interconnected by edges. To create a graph that corresponds to an indoor area, a grid of points 202 may be overlaid on a schematic map 106 of the indoor area. Additionally or alternatively, lines (e.g., edges of a graph) that interconnect overlaid points (e.g., nodes of a graph) may be drawn, for example, to create a graph. For the sake of visual clarity for FIG. 2, only a portion of a grid of points 202 or a connectivity graph 204 are explicitly shown for a portion of an indoor area. A connectivity graph 204 may be created, for example, by limiting lines that interconnect points of grid of points 202 to those lines that are capable of extending from one point to another point without crossing an obstruction 108, such as an impervious building feature (e.g., a wall or a closed door). By way of example only, a connectivity graph 204 may be created from a grid of points 202 as illustrated by omitting those edges that cross (or would cross) a wall, door, etc.

A feasible path may comprise, by way of example but not limitation, a path along one or more lines of a connectivity graph that links at least two points of the connectivity graph such that the path is unblocked by a wall or other obstruction 108. Thus, a feasible path may extend between two points without crossing an obstruction. An example of a feasible path between points "A" and "B" of connectivity graph 204 is shown in schematic diagram 200 as feasible path 208. However, other feasible paths may also or alternatively be drawn between points "A" and "B".

An infeasible path may comprise, by way of example but not limitation, a path along one or more lines of a connectivity graph that links at least two points of the connectivity graph, but with the path effectively being blocked by a wall or other obstruction 108. An infeasible path may extend between two points, but it crosses (or would cross) an obstruction. An example of an infeasible path between points "A" and "B" of connectivity graph 204 is shown in schematic diagram 200 as infeasible path 206. An obstruction that is crossed by infeasible path 206 is marked in schematic diagram 200 with an "X". However, other infeasible paths may also or alternatively be drawn between points "A" and "B".

A routability graph implementation (not separately shown in FIG. 2) of a connectivity graph 204 may comprise, for example, a connectivity graph that includes additional map features corresponding to indoor environment characteristics 116 so as to facilitate a determination of a route from one point (e.g., an origin or current location) to another point (e.g., a destination) of an indoor area. A routability graph may be descriptive of feasible areas of a given schematic map or may indicate how traversal is possible from one position to another position.

A connectivity graph 204 or a routability graph may be linked to or otherwise associated with annotations (not explicitly shown). A connectivity graph, a routability graph, or annotations may be included as part of, may be linked to, or may otherwise be associated with a schematic map 106. Annotations may indicate point of interest (POI) features for an indoor area or attributes of specific locations or aspects of a schematic map or a physical indoor environment to which it corresponds. POI features may comprise, by way of example but not limitation, names of stores; locations of restrooms; names of office inhabitants; locations of copier or break rooms; purposes of rooms; identifications of stairs, escalators, or elevators; identifications of points of ingress or egress; or any combination thereof; etc. By way of example but not limitation, annotations may be associated with particular portion(s) of a routability graph. However, claimed subject matter is not limited to any particular example implementation of a schematic map, a connectivity graph, a routability graph, annotations, or POI features, etc.

A connectivity graph, a routability graph, or annotations may be used to provide a navigational application, such as positioning, providing static directions, providing turn-by-turn directions, or any combination thereof, etc. using a mobile device. A navigational application may facilitate travel from a first point to a second point of e.g. an indoor area using, for example, a routability graph. Using a routability graph, a mobile device may plot a path from a current location to a targeted destination. A mobile device may determine a current location, including but not limited to as a user travels within an indoor area while carrying a mobile device, using any one or more of the above-described techniques, for example. Determination of a current estimated location of a mobile device as it is moved within an indoor area may be facilitated using a likelihood heatmap, as is described further herein below.

Figure 3:
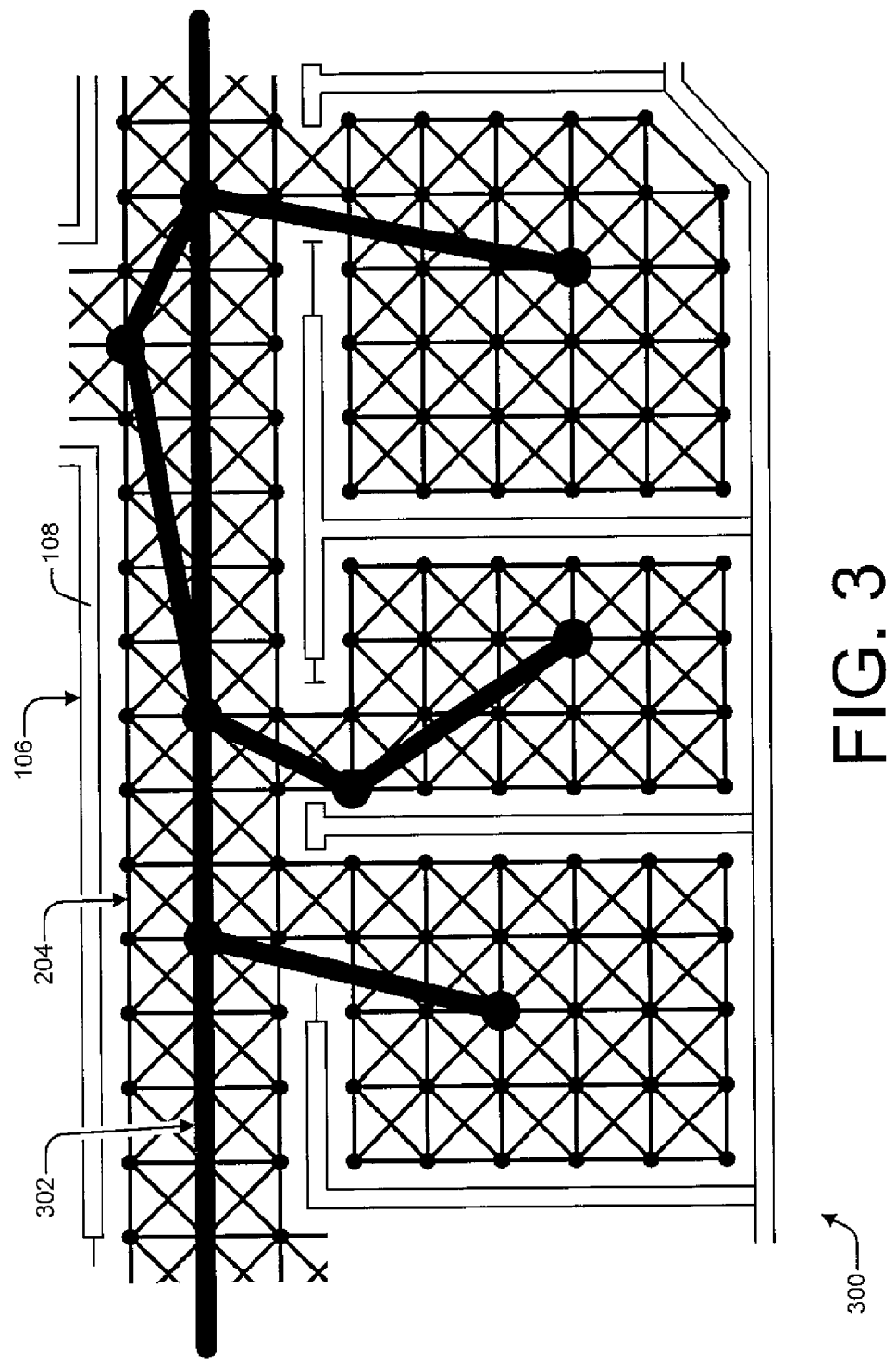
FIG. 3 is a schematic diagram that illustrates an example sparse connectivity graph overlay for an indoor area according to an implementation.

FIG. 3 is a schematic diagram 300 that illustrates an example sparse connectivity graph overlay for an indoor area according to an implementation. As illustrated, schematic diagram 300 may include a schematic map 106, one or more obstructions 108, at least one connectivity graph 204, or at least one sparse connectivity graph 302. As shown, points or lines of sparse connectivity graph 302 are larger or thicker than points or lines of connectivity graph 204. For certain example embodiments, a sparse connectivity graph 302 may comprise, as compared to connectivity graph 204 (e.g., a "dense" connectivity graph), a reduced connectivity graph that includes fewer points or interconnecting lines. As described above, points or lines of a sparse connectivity graph 302 may correspond to positions or paths that are more likely to be occupied by a mobile device than positions or paths that are not included as part of sparse connectivity graph 302.

In example implementations, a sparse connectivity graph 302 may be derived based, at least in part, on connectivity graph 204 as described herein and as described in U.S. patent application Ser. No. 13/180,153, titled "Methods and Apparatuses for Use in Generating an Encoded Routeability Graph Description," assigned to the assignee of the present application and filed on the same day as the present application, and U.S. Provisional Application No. 61/363,980, filed Jul. 13, 2010, and titled, "Map Reduction," assigned to the assignee of the present application. By way of example but not limitation, positions that are relatively central in each room may be determined to comprise a point of a sparse connectivity graph 302. With regard to hallways, positions that fall along a central portion of a hallway may be determined to comprise points of a sparse connectivity graph 302. Furthermore, points that both fall along a central portion of a hallway and are proximate to points of ingress/egress for rooms may be designated as points of a sparse connectivity graph 302. Additionally or alternatively, points for a sparse connectivity graph 302 may be determined by analyzing points of connectivity graph 204 and permitting certain nodes to absorb other nodes. In an example implementation, nodes that are positioned relatively farther from obstructions 108 may absorb those nodes that are relatively closer to obstructions 108, e.g. as long as there is line-of-sight there between. However, claimed subject matter is not limited to these particular examples for sparse connectivity graphs.

By way of example but not limitation, sparse connectivity graph 302 may be derived from connectivity graph 204 such that each point in connectivity graph 204 has a direct line-of-sight to at least one point of sparse connectivity graph 302. Additionally or alternatively, points of sparse connectivity graph 302 may be determined such that they are relatively more significant in a map context or routability sense. For example, points of sparse connectivity graph 302 may generally be located at or near centers of rooms or hallway intersection points of a schematic map.

As shown, points of sparse connectivity graph 302 may be interconnected by lines. Lines between points of sparse connectivity graph 302 may track or model feasible paths within a given indoor area that are relatively more likely to be traveled than other feasible paths of a connectivity graph 204. Hence, lines of connectivity graph 204 that track lines of sparse connectivity graph 302 may be more likely to be traveled than lines of connectivity graph 204 that do not track lines of sparse connectivity graph 302.

For a heatmap that indicates positioning likelihoods (e.g., for a mobile device that is currently traveling within an indoor area), a location likelihood for each position may be generated. A location likelihood value may be used by a location positioning engine to improve or refine a location estimate. A likelihood value for a particular point of a connectivity graph may be based, at least in part, on feasible paths through an indoor area that traverse the particular point. Feasible paths between grid point pairs that traverse a particular point may be determined based, at least in part, on a cost for each feasible path. By way of example only, a smallest cost path between grid point pairs that traverse a particular grid point may be determined. A cost may comprise, by way of example but not limitation, a length of a path between grid point pairs. If a cost comprises a length of a path, a smallest cost may comprise a shortest path between grid point pairs. Although claimed subject matter is not so limited, some example implementations that are described herein refer to costs that pertain to shortest paths.

In example implementations, one or more shortest path procedures may be instituted to determine paths between pairs of grid points. Application of shortest path procedures are well known in the art. Examples of shortest path procedures may comprise, but are not limited to, a Dijkstra procedure, a Floyd-Warshall procedure, a Bellman-Ford procedure, a Johnson procedure, a perturbation procedure, or any combination thereof, etc. By way of example but not limitation, bottle necks in feasible paths may be detected by applying e.g. a Dijkstra shortest path procedure for each pair of grid points in a connectivity graph.

For certain example implementations, a feasible path between a grid point pair of a connectivity graph may be constrained with regard to a sparse connectivity graph. For example, if a shortest path between a grid point pair is being determined, such a shortest path may be constrained to traverse points of a sparse connectivity graph. By way of example but not limitation, shortest paths between grid point pairs of a connectivity graph may be further constrained to be based, at least in part, on a shortest distance between (i) a shortest path between the grid point pairs and (ii) lines of a sparse connectivity graph. For instance, at least one reduced cost may be attributed to one or more nodes or one or more edges of a sparse connectivity graph. Additionally or alternatively, a shortest path between a grid point pair of a connectivity graph may be further constrained by increasingly penalizing a path as it deviates farther from a line of a sparse connectivity graph.

Figure 4:
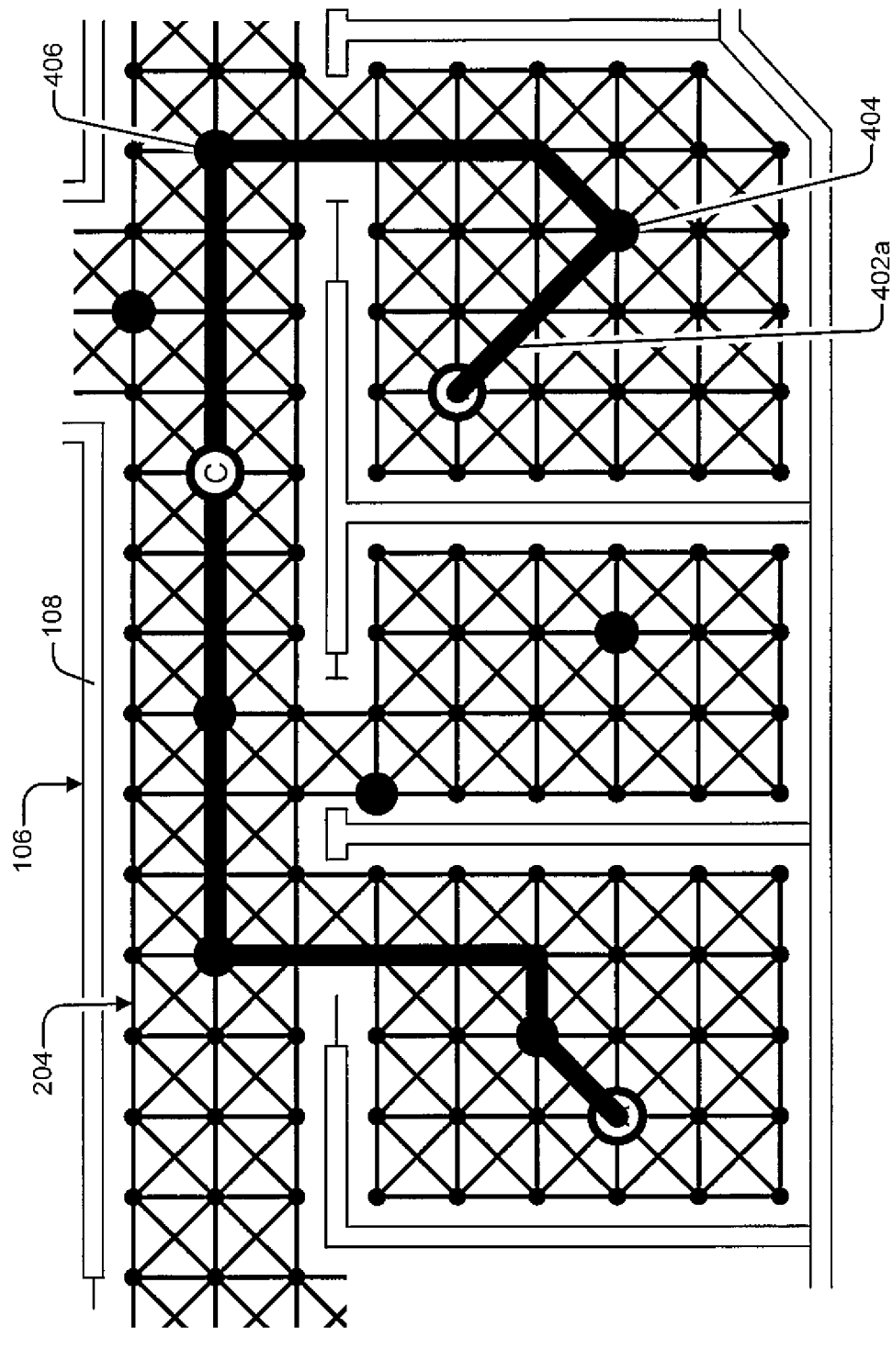
FIG. 4 is a schematic diagram that illustrates an example of a feasible path between a pair of grid points that traverses a particular grid point according to an implementation.

FIG. 4 is a schematic diagram 400 that illustrates an example of a feasible path between a pair of grid points that traverses a particular grid point according to an implementation. As illustrated, schematic diagram 400 may include a schematic map 106, one or more obstructions 108, at least one connectivity graph 204, or at least one constrained shortest feasible path 402*a*. In FIG. 4, points of a sparse connectivity graph (e.g., a sparse connectivity graph 302 of FIG. 3) are depicted as being larger than points of connectivity graph 204. Three points are indicated in schematic diagram 400: point "A", point "B", and point "C".

For certain example implementations, a feasible path may be determined between a pair of grid points, such as between point "A" and point "B". By way of example but not limitation, a feasible path may be determined based, at least in part, on a shortest path procedure that is affected by a sparse connectivity graph. Determination of a feasible path may be constrained based, at least in part, on a sparse connectivity graph. As shown, constrained shortest feasible path 402*a* extends from pair of grid points "A" and "B" and traverses a particular grid point "C". Constrained shortest feasible path 402*a* may be constrained to traverse one or more points of a sparse connectivity graph. For example, constrained shortest feasible path 402*a* may "extend" from grid point "B" and pass through a grid point 404 that comprises a point of a sparse connectivity graph and that is located approximately in a central region of a room in which grid point "B" is located. Similarly, upon "exiting" a room in which grid point "B" is located and reaching a hallway, instead of hugging a wall, constrained shortest feasible path 402*a* may traverse traversed grid point 406, which comprises a point of a sparse connectivity graph, prior to traversing particular gird point "C".

In example implementations, feasible paths may be traversed between starting grid points (e.g., a grid point "A" or a grid point "B") and ending grid points (e.g., a grid point "B" or a grid point "A") to establish traversed paths. Traversed paths may be established (e.g., determined, ascertained, produced, any combination thereof, etc.), by way of example but not limitation, by directing a feasible path through particular grid points, such as one or more grid points of a sparse connectivity graph, between a starting grid point and an ending grid point. A traversed path may include one or more intermediate grid points that are located between a starting grid point and an ending grid point. The intermediate grid points may be subject to a smallest cost that is based, at least in part, on a length of a traversed path. A likelihood value may be attributed to (e.g., assigned to, associated with, linked to, or some combination thereof, etc.) each intermediate grid point of a traversed path for a likelihood heatmap. A smallest cost may be affected based, at least in part, on a sparse connectivity graph for a given indoor area. To cause a traversed path to include as intermediate grid points one or more points of a sparse connectivity graph, a reduced cost (e.g., a cost that is less than an absolute physical distance) may be attributed to the intermediate grid points based, at least in part, on the sparse connectivity graph. By way of example but not limitation, a feasible path may be constrained based, at least in part, on one or more grid points of a sparse connectivity graph.

Figure 5:
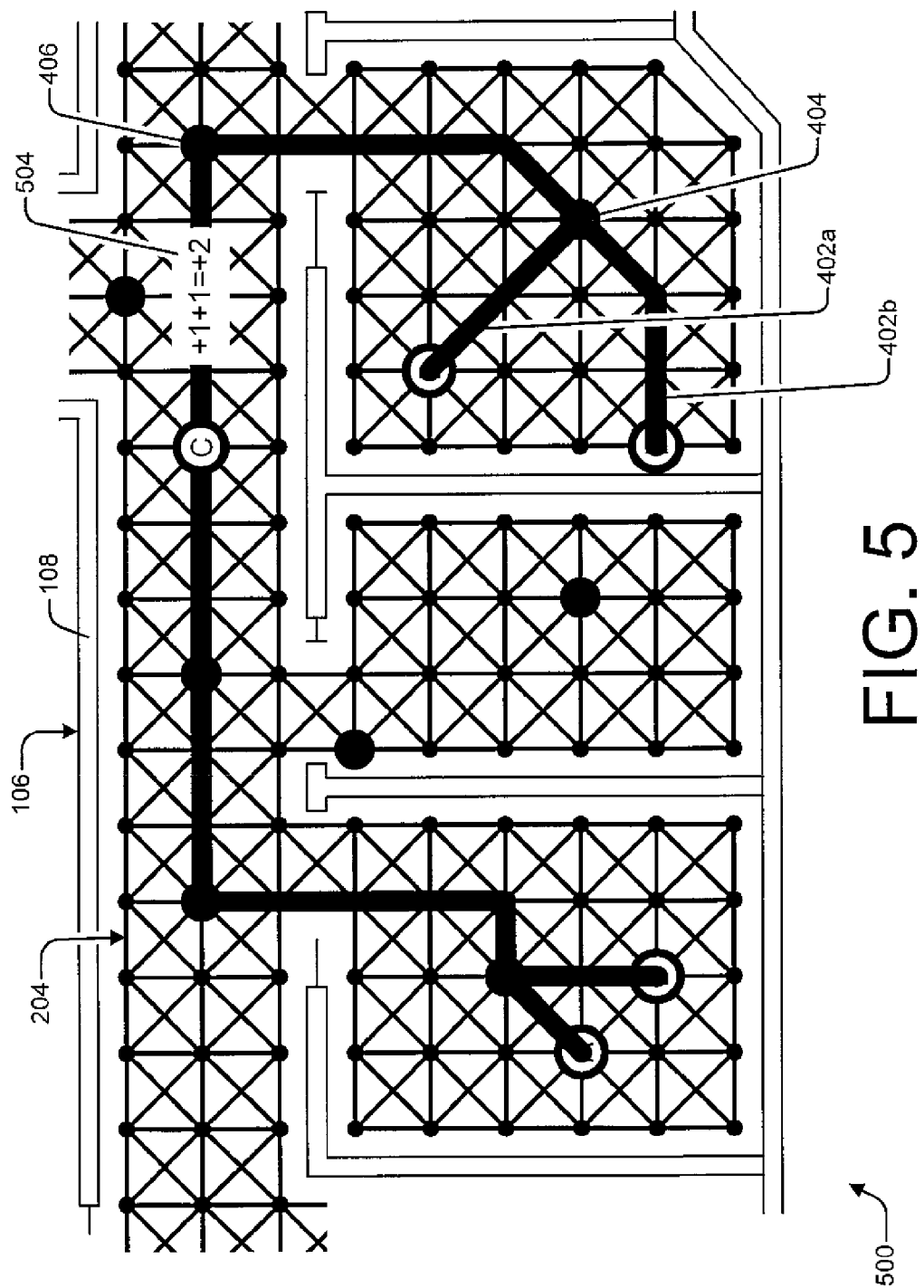
FIG. 5 is a schematic diagram that depicts an example counting of multiple feasible paths between pairs of grid points that traverse a particular grid point according to an implementation.

FIG. 5 is a schematic diagram 500 that depicts an example counting of multiple feasible paths between pairs of grid points that traverse a particular grid point according to an implementation. As illustrated, schematic diagram 500 may include a schematic map 106, one or more obstructions 108, at least one connectivity graph 204, or multiple constrained shortest feasible paths, such as constrained shortest feasible path 402*a* or constrained shortest feasible path 402*b*. As described herein above with particular reference to FIG. 4, a feasible path, such as constrained shortest feasible path 402*a*, may be determined that traverses a particular point "C" between a pair of grid points "A" and "B" based, at least in part, on a shortest path procedure or a constraint that is responsive to a sparse connectivity graph.

For certain example implementations, a count 504 of constrained shortest feasible paths that traverse a particular point "C" may be determined. A count 504 of such feasible paths may be used to generate a positioning likelihood value for a particular point "C" for a likelihood heatmap. As illustrated, a constrained shortest feasible path 402*b* may extend between another pair of grid points "D" and "E" and traverse particular point "C". Constrained shortest feasible path 402*b* may be determined based, at least in part, on a shortest path procedure or a constraint that is responsive to a sparse connectivity graph. For example, constrained shortest feasible path 402*b* may extend from grid point "E" and pass through a grid point 404 that comprises a point of a sparse connectivity graph that is located approximately in a central region of a room in which grid point "E" is located. Similarly, upon exiting a room in which grid point "E" is located and reaching a hallway, instead of hugging a wall, constrained shortest feasible path 402*b* may traverse traversed grid point 406, which comprises a point of a sparse connectivity graph, prior to traversing particular gird point "C".

In example implementations, constrained shortest feasible paths may be determined between multiple grid point pairs. A count of such feasible paths that traverse a particular grid point may be maintained for each of multiple particular points. By way of example but not limitation, a token may be dropped at each node as a constrained shortest path is determined to traverse it. As shown, feasible paths between grid point pairs "A" and "B" and between grid point pairs "D" and "E" both traverse particular grid point "C". Consequently, count 504 indicates that two (e.g., +1+1=+2) feasible paths between grid point pairs traverse particular grid point "C" as constrained by a sparse connectivity graph. This procedure may be repeated for multiple pairs of grid points (e.g., of a dense connectivity graph). In an example implementation, at least one shortest path procedure as constrained by at least one sparse connectivity graph may be applied to each possible pair of grid points. A count of those resulting constrained shortest feasible paths that traverse each particular point may be maintained.

For certain example implementations, counts corresponding to each particular point may be used to determine relative positioning likelihoods for a likelihood heatmap. In one implementation, count values may be used for measuring relative weights given to particular points. At a particular point, a likelihood of moving to a neighboring point may be determined based, at least in part, on the count value of that neighboring point relative to count values attributed to other neighboring points.

Figure 6:
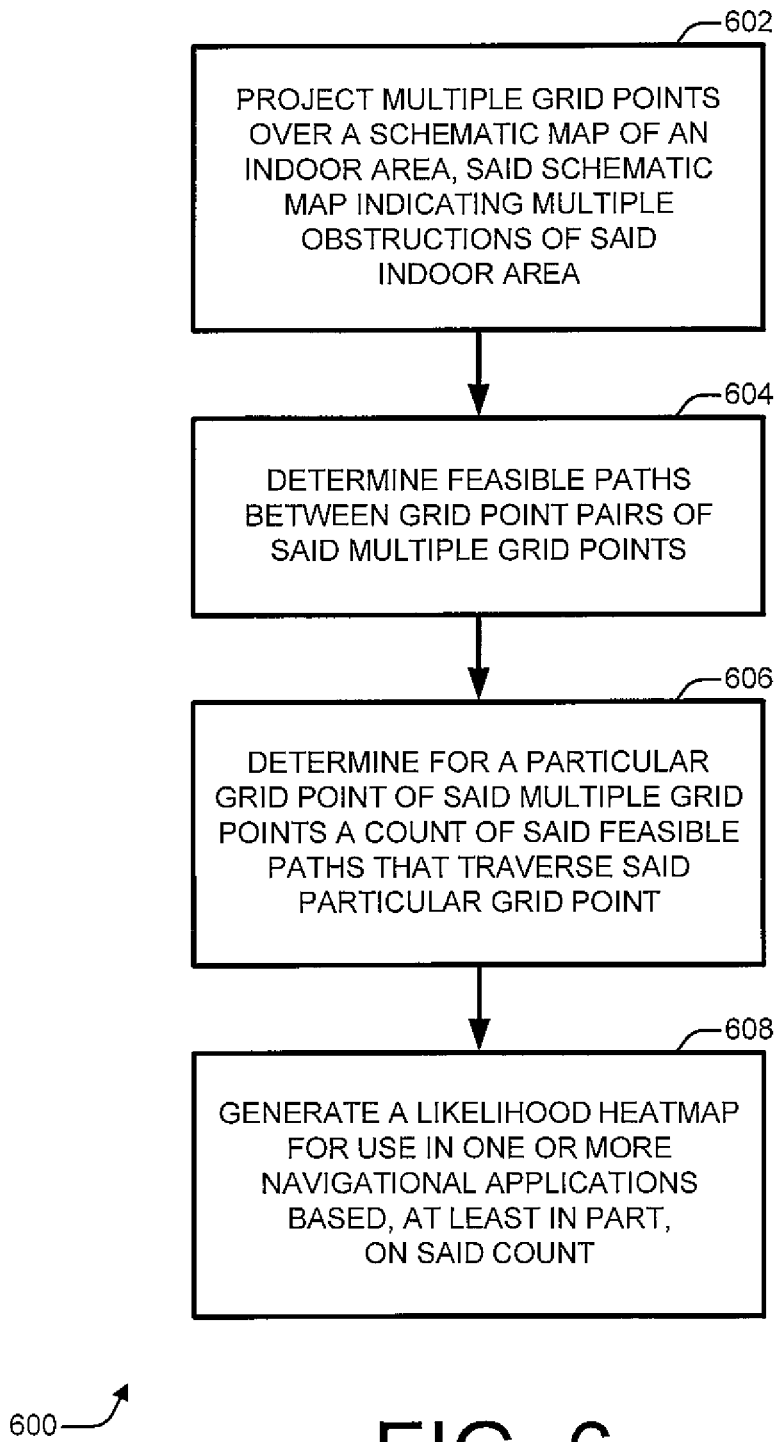
FIG. 6 is a flow diagram illustrating an example method for a device to generate a likelihood heatmap according to an implementation.

FIG. 6 is a flow diagram 600 illustrating an example method for a device to generate a likelihood heatmap according to an implementation. As illustrated, flow diagram 600 may include any of operations 602-608. Although operations 602-608 are shown and described in a particular order, it should be understood that methods may be performed in alternative manners without departing from claimed subject matter, including but not limited to, with a different order or number of operations. Also, at least some operations of flow diagram 600 may be performed so as to be fully or partially overlapping with other operation(s).

For certain example implementations, one or more of operations 602-608 may be performed at least partially by at least one device, such as a server device or a mobile device. Example realizations for a server device, as well as additional server device examples, are described herein below with particular reference to at least FIG. 12. Example realizations for a mobile device, as well as additional mobile device examples, are described herein below with particular reference to at least FIG. 13. At operation 602, multiple grid points may be projected over a schematic map of an indoor area, with said schematic map indicating multiple obstructions of said indoor area. At operation 604, feasible paths may be determined between grid point pairs of said multiple grid points. At operation 606, for a particular grid point of said multiple grid points, a count of said feasible paths that traverse said particular grid point may be determined. At operation 608, a likelihood heatmap may be generated for use in one or more navigational applications based, at least in part, on said count.

After generation of at least a portion of a likelihood heatmap, a device may initiate transmission of at least a portion of the likelihood heatmap or use at least a portion of the likelihood. By way of example only, a server device may transmit a likelihood heatmap to a mobile device, to another server device that further disseminates the likelihood heatmap, any combination thereof, etc. Also by way of example only, a mobile device may transmit a likelihood heatmap to another mobile device, to a server device that further disseminates the likelihood heatmap, any combination thereof, etc. Additionally or alternatively, a server device or a mobile device may use a likelihood heatmap to determine an estimated location of a mobile device.

Figure 7:
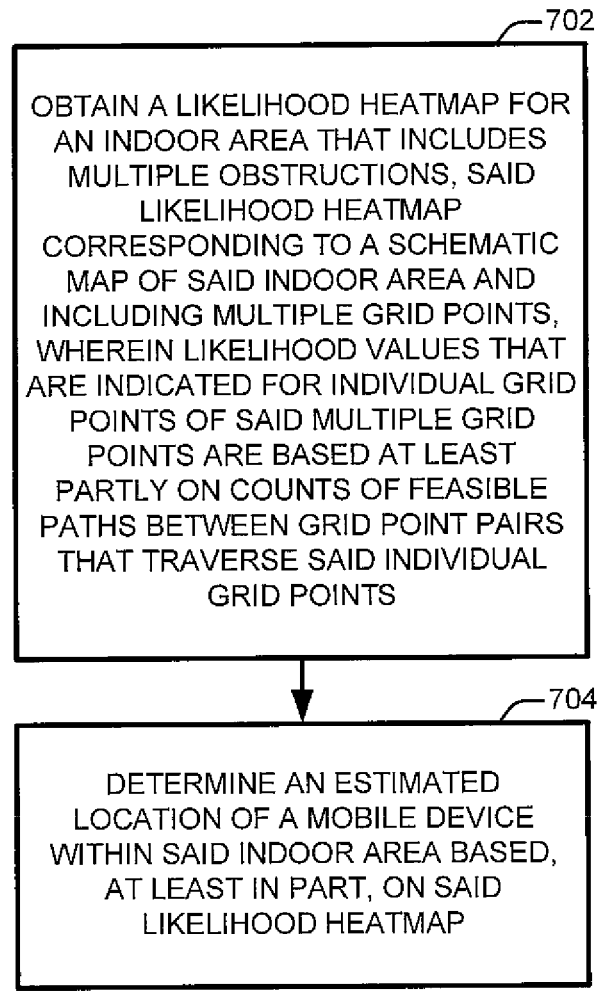
FIG. 7 is a flow diagram illustrating an example method for a device to use a likelihood heatmap according to an implementation.

FIG. 7 is a flow diagram 700 illustrating an example method for a device to use a likelihood heatmap according to an implementation. As illustrated, flow diagram 700 may include any of operations 702-704. Although operations 702-704 are shown and described in a particular order, it should be understood that methods may be performed in alternative manners without departing from claimed subject matter, including but not limited to, with a different order or number of operations. Also, at least some operations of flow diagram 700 may be performed so as to be fully or partially overlapping with other operation(s).

For certain example implementations, one or more of operations 702-704 may be performed at least partially by at least one device, such as a server device or a mobile device. At operation 702, a likelihood heatmap may be obtained for an indoor area that includes multiple obstructions, with said likelihood heatmap corresponding to a schematic map of said indoor area and including multiple grid points. Likelihood values that are indicated for individual grid points of said multiple grid points may be based at least partly on counts of feasible paths between grid point pairs that traverse said individual grid points. At operation 704, an estimated location of a mobile device within said indoor area may be determined based, at least in part, on said likelihood heatmap.

An estimated location may be used by a mobile device or a server device to provide or implement a navigational application, e.g., for a user of a mobile device. A navigational application may include, by way of example but not limitation, providing a map, indicating a current location on a map, providing static directions, providing real-time turn-by-turn directions, determining a position or positioning, or any combination thereof, etc. Many indoor areas are sufficiently large, complex, or otherwise difficult to navigate such that navigational applications may be desirable to an individual currently located in an indoor area. Location-based services may include a navigational application such as personal vehicle/pedestrian navigation, location-based offers for goods or services, location-based searching (e.g., searching of local points of interest), or any combination thereof, etc., just to name a few examples.

Figure 8:
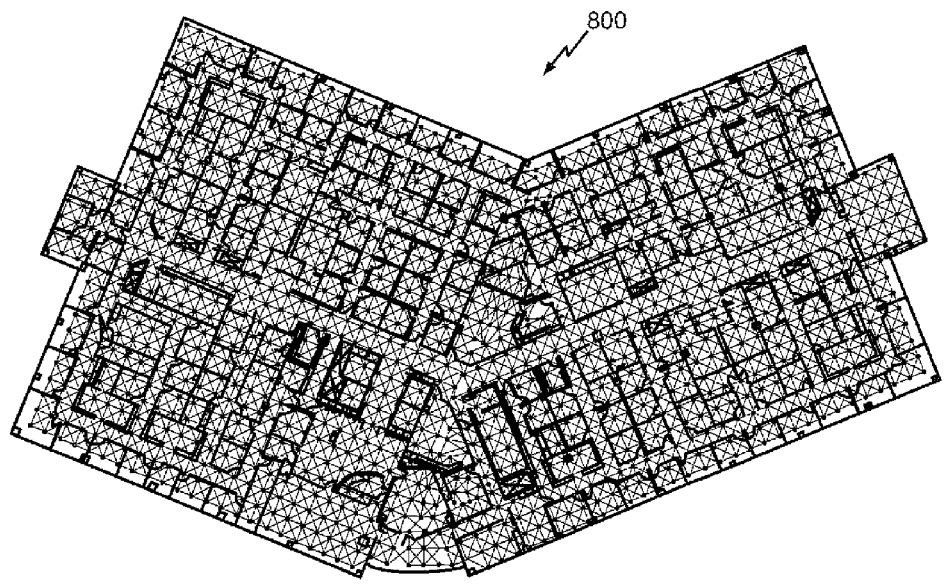
FIG. 8 is a schematic map of a floor of a building that illustrates an example dense connectivity graph according to an implementation.

FIG. 8 is a schematic map 800 of a floor of a building that illustrates an example connectivity graph according to an implementation. A floor of a "v-shaped" building is shown as an example schematic map 800 over which a connectivity graph has been overlaid. Walls are illustrated that define rooms, corridors, etc. Multiple points of a grid of points are shown as dark dots. Lines of a connectivity graph are shown as thin gray lines that interconnect points. For an example implementation, the illustrated multiple points and interconnecting lines may form a dense connectivity graph for a building floor.

Figure 9:
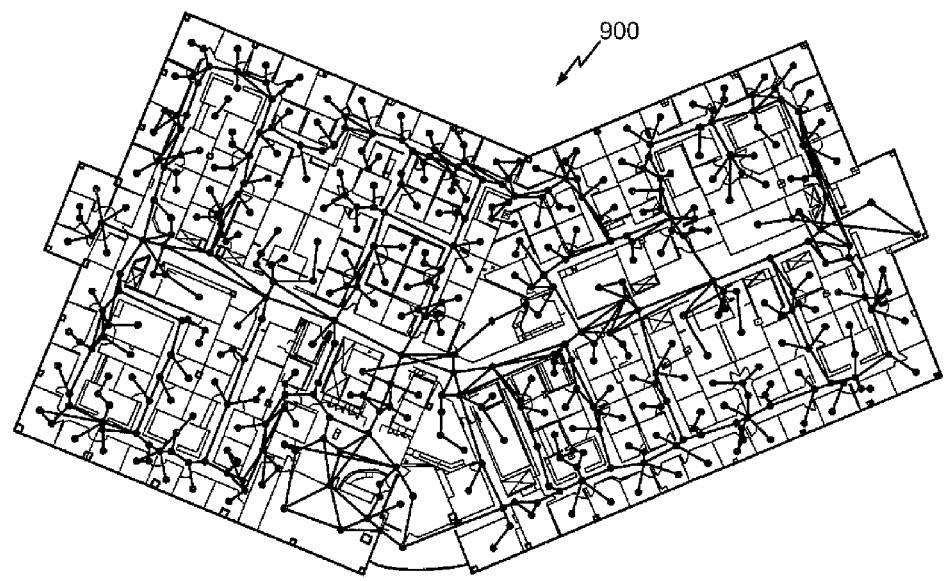
FIG. 9 is a schematic map of a floor of a building that illustrates an example sparse connectivity graph according to an implementation.

FIG. 9 is a schematic map 900 of a floor of a building that illustrates an example sparse connectivity graph according to an implementation. As illustrated in an example schematic map 900, a sparse connectivity graph may correspond to a dense connectivity graph that is illustrated in FIG. 8. As shown, reduced points of a sparse connectivity graph may be determined such that they are generally positioned in hallway intersection points or centers of rooms or other locations that might be expected to have relatively higher traffic patterns. From a comparison of FIGS. 8 and 9, it can be seen that each point of a dense connectivity graph of schematic map 800 may have a line-of-sight to at least one point of a sparse connectivity graph of schematic map 900. However, claimed subject matter is not limited to these particular examples of dense and sparse connectivity graphs.

To produce a likelihood heatmap, shortest paths between pairs of points (i,j) in a dense connectivity graph may be determined. To compute them, shortest paths may be constrained to travel through points of a sparse connectivity graph. This constraint may produce shortest paths that travel through points that are expected to be located along well trafficked routes. As paths are determined, a counter indicating a number of times a particular point or an edge has been traversed may be increased (e.g., incremented). Points or edges that lie along relatively more common paths may therefore be incremented more often than those points or edges that lie along relatively less common paths. As a consequence, points in a central region of a hallway or points in a central region of a room may be assigned relatively higher likelihoods for a likelihood heatmap. Furthermore, points of a dense connectivity graph that are shared with a sparse connectivity graph may be assigned relatively higher likelihoods as compared to points of a dense connectivity graph that are not shared with a sparse connectivity graph. Paths between points of a sparse connectivity graph may similarly be more likely than paths that do not link points of a sparse connectivity graph. Paths into or out of a room may be routed through a center of the room. Thus, a likelihood of being present at or moving to centers of rooms may be relatively greater as well. This routing may create natural likelihood "black holes" in centers of rooms.

Figure 10:
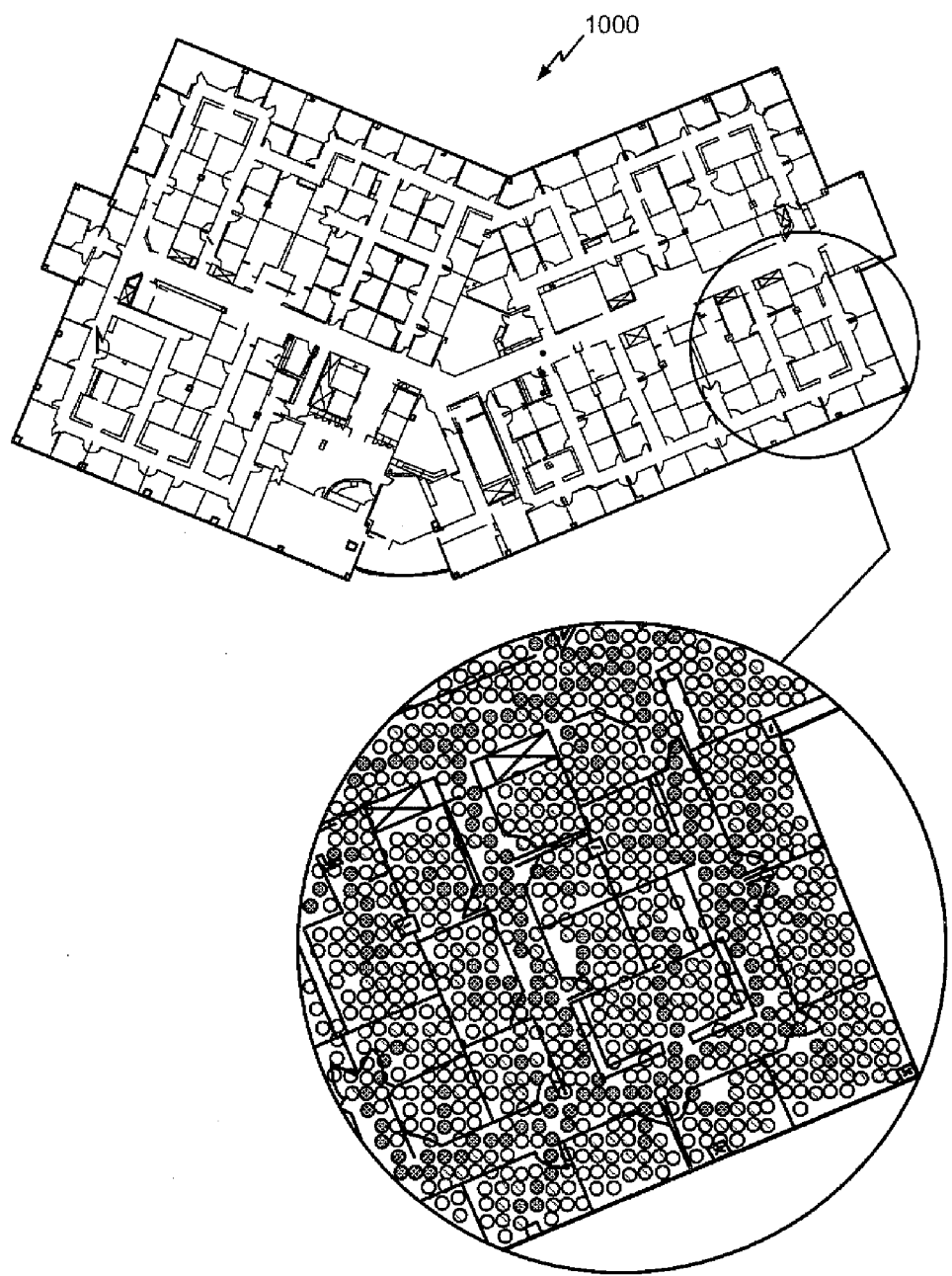
FIG. 10 is a schematic map of a floor of a building that illustrates an example likelihood heatmap according to an implementation.

FIG. 10 is a schematic map 1000 of a floor of a building that illustrates an example likelihood heatmap according to an implementation. As illustrated in example schematic map 1000, a likelihood heatmap may include multiple points that correspond to positions of an indoor area. For an example heatmap as illustrated in FIG. 10, it may be generated by applying e.g. a Dijkstra shortest path procedure on multiple grid point pairs of a dense connectivity graph (e.g., of FIG. 8) as constrained by a sparse connectivity graph (e.g., of FIG. 9) overlay. In example implementations, positions of a likelihood heatmap may have associated likelihood values. Multiple points or locations of a likelihood heatmap may correspond, by way of example but not limitation, to multiple points of a dense connectivity graph as shown in schematic map 800. Additionally or alternatively, a dense connectivity graph or a dense likelihood heatmap may be pruned to produce a likelihood map that is reduced compared to an original dense connectivity graph but still sufficiently dense to meet parameters that are specified by a positioning system.

As shown in schematic map 1000, a likelihood value or relative range for multiple positions may be indicated using shadings. Darker (e.g., black) points may have higher likelihood values, and increasingly lighter (e.g., gray to white) points may have increasingly lower likelihood values. In schematic map 1000, the darkest points are generally located along central regions of hallways. Dark gray points generally lead from hallways into central regions of rooms. Light gray points generally spread out around central regions of rooms. White points are generally located between central regions of rooms and perimeters of rooms. However, a likelihood heatmap may be implemented differently without departing from claimed subject matter.

Figure 11:
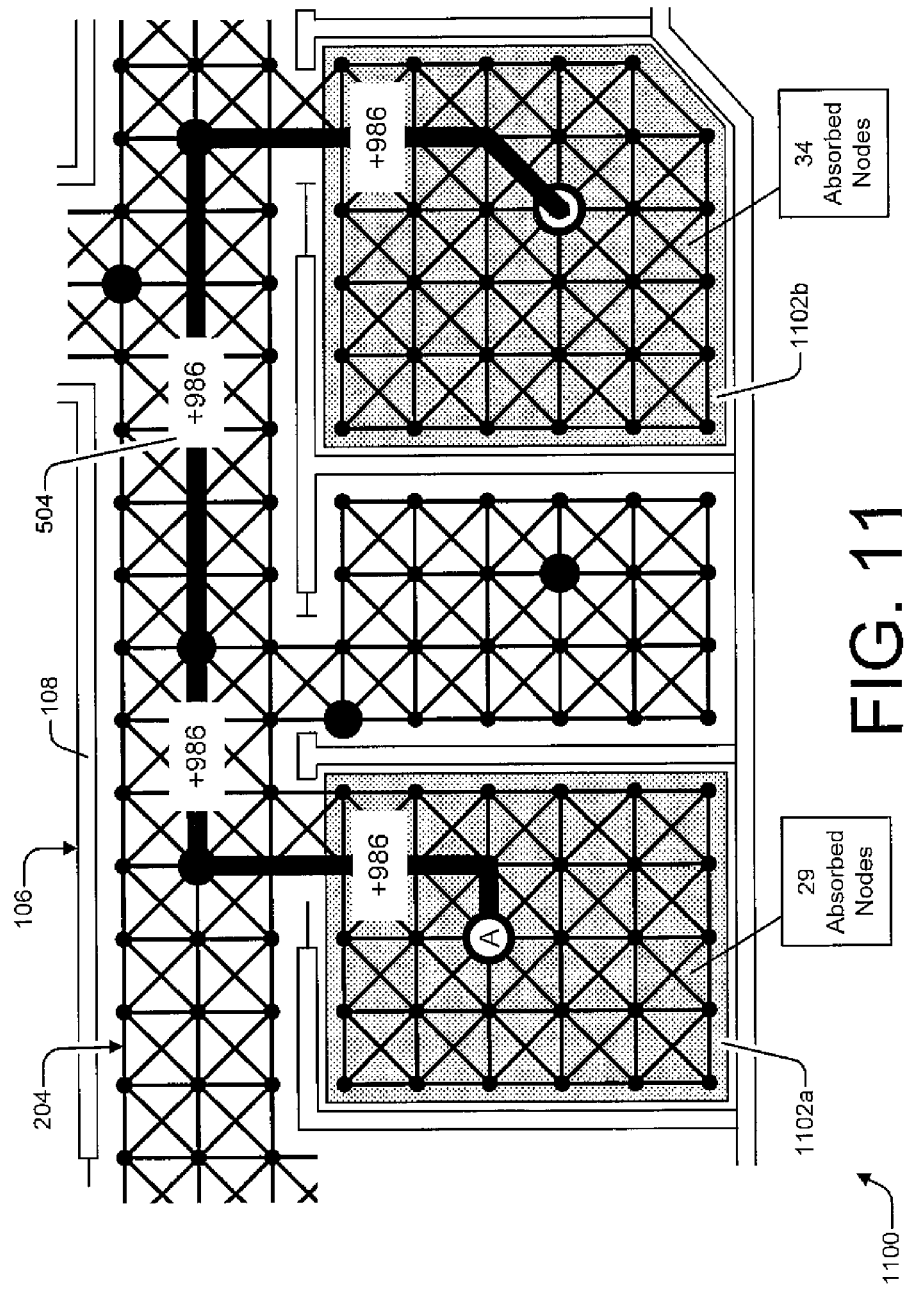
FIG. 11 is a schematic diagram that depicts another example counting of multiple feasible paths between pairs of grid points that traverse a particular grid point according to an implementation.

FIG. 11 is a schematic diagram 1100 that depicts another example counting of multiple feasible paths between pairs of grid points that traverse a particular grid point according to an implementation. As illustrated, schematic diagram 1100 may include schematic map 106, one or more obstructions 108, at least one connectivity graph 204, at least one count 504 for at least one particular point, a room 1102a, or a room 1102b. A pair of points "A" and "B" are also indicated in schematic diagram 1100. A constrained shortest path between pair of points "A" and "B" as constrained by points of a sparse connectivity graph is depicted by a thick black line.

Calculating shortest paths for multiple pairs of points may be costly in terms of computing resources or time, especially for connectivity graphs that are large due to a size of a schematic map or a desired level of granularity. Such a cost may be exacerbated by an added complexity of constraining shortest paths through points of a sparse connectivity graph. However, performance may be improved by leveraging one or more properties of a sparse connectivity graph.

For certain example implementations, each point of a sparse connectivity graph may be created via "absorption" of one or more points of a corresponding dense connectivity graph. Thus, each point of a sparse connectivity graph may have absorbed a set of points of a corresponding dense connectivity graph. Using knowledge of absorbed points or pre-computing single hop paths between neighboring points of a sparse connectivity graph, shortest paths between multiple points of a dense connectivity graph may be computed relatively more efficiently. For example, a number of points in a set of points of a dense connectivity graph that have each been absorbed by a same point of a sparse connectivity graph may be used to expedite a count of shortest paths. By way of example only, points in a room of a dense connectivity graph that have been absorbed by a single point of a sparse connectivity graph may be handled jointly when computing one or more counts of at least a portion of a shortest path for multiple pairs of points.

Schematic diagram 1100 illustrates an example implementation. As shown for room 1102a, point "A" of a sparse connectivity graph has absorbed 29 points of a dense connectivity graph. For room 1102b, point "B" of a sparse connectivity graph has absorbed 34 points of a dense connectivity graph. In example implementations, a count of feasible paths that traverse a particular grid point may be based, at least in part, on a number of absorbed grid points. For instance, a count for each hop between point "A" and point "B" may be increased (e.g., incremented) by +986 (29*34=986). A shortest path between pair of points "A" and "B" may be traversed once and a count of 986 may be assigned to each hop along the shortest path. Paths between point "A" and its absorbed neighbors and point "B" and its absorbed neighbors may be incremented based, at least in part, on such a count.

Paths between a point of a sparse connectivity graph and points that it has absorbed from a dense connectivity graph may be termed local paths. Local paths are relatively shorter and therefore more manageable. Local paths may be computed and their counts incremented more efficiently than longer paths across a dense connectivity graph for a given schematic map. For an example indoor area (e.g., for a floor as shown in FIGS. 8-10), computational time may be reduced from a couple of hours to a few seconds by taking into consideration a number of nodes that have been absorbed as described above with particular reference to at least FIG. 11.

Figure 12:
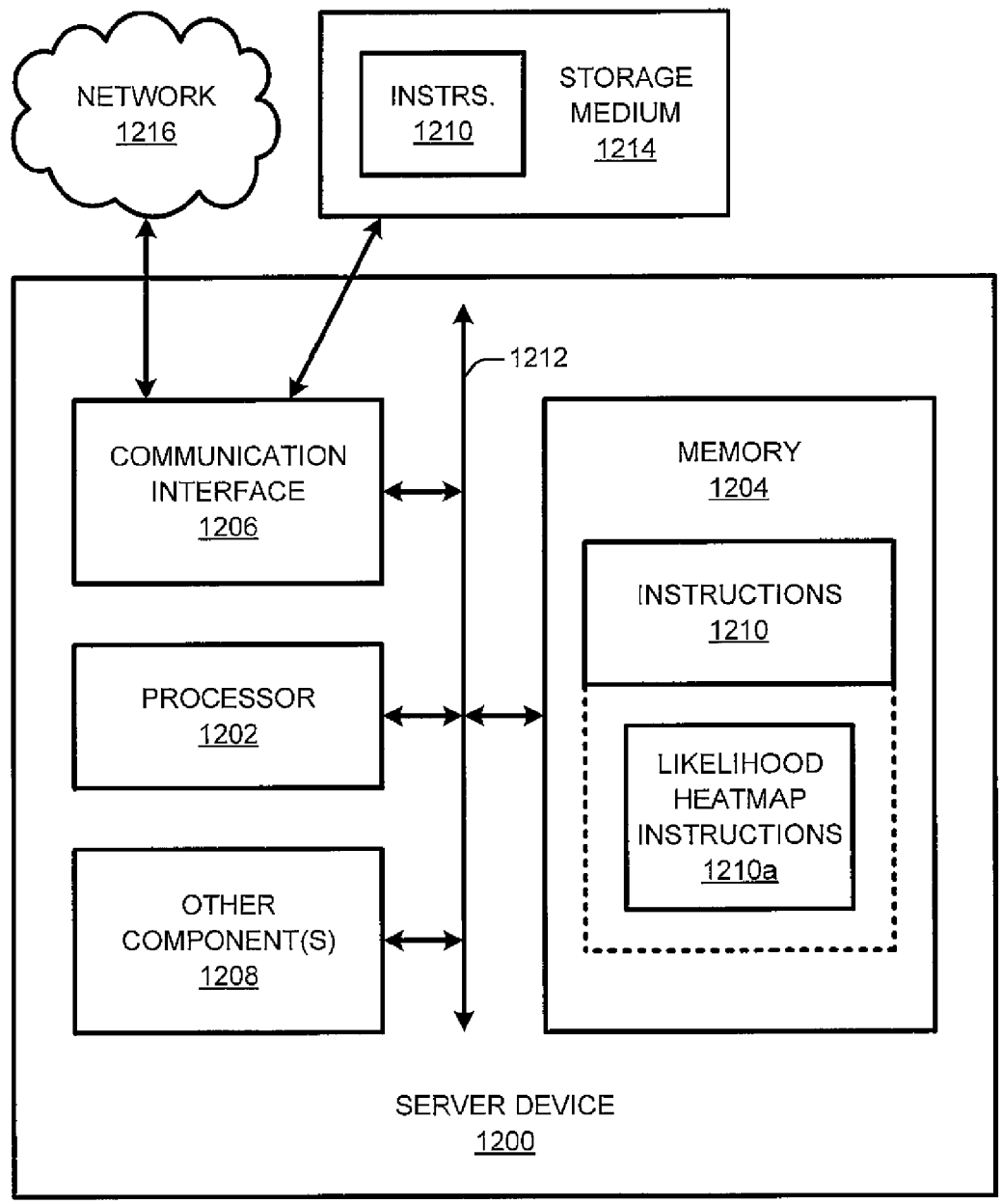
FIG. 12 is a schematic diagram illustrating an example server device, according to an implementation, that may implement one or more aspects of indoor likelihood heatmaps according to an implementation.

FIG. 12 is a schematic diagram illustrating an example server device 1200, according to an implementation, that may implement one or more aspects of indoor likelihood heatmaps according to an implementation. As illustrated, server device 1200 may include at least one processor 1202, one or more memories 1204, at least one communication interface 1206, one or more other component(s) 1208, or at least one interconnect 1212, etc. FIG. 12 also illustrates at least one storage medium 1214 and one or more networks 1216. A server device 1200 may have access to storage medium 1214 or networks 1216. Memory 1204 or storage medium 1214 may include instructions 1210. However, a server device 1200 may alternatively include or have access to more, fewer, or different components from those that are illustrated without departing from claimed subject matter.

For certain example implementations, server device 1200 may include or comprise at least one electronic device, such as a device with processing capabilities. Server device 1200 may comprise, for example, any electronic device having at least one processor or memory. Examples of server devices 1200 may include, but are not limited to, a desktop computer, one or more server blades, at least one server machine, a server farm, at least one telecommunications node, an intelligent router or switch, an access point, or any combination thereof, etc.

One or more processors 1202 may comprise one or more separate or integrated processors. A processor 1202 may be programmed with instructions, such as instructions 1210, to become a special purpose processor that implements at least a portion of any procedure(s) that are described herein. Memory 1204 may store, contain, or otherwise provide access to at least a portion of instructions 1210 that may be executable by a processor 1202. Examples for instructions 1210 may include, but are not limited to: a program, or an application, etc. or portion thereof; operational data structures; processor-executable instructions; computer-implemented instructions; code or coding; or any combination thereof; etc. Execution of instructions 1210 by one or more processors 1202 may transform server device 1200 into a special purpose computing device, apparatus, platform, or any combination thereof, etc.

Instructions 1210 may include, by way of example but not limitation, likelihood heatmap instructions 1210*a*. In certain example implementations, likelihood heatmap instructions 1210*a* may correspond to, for example, instructions that are capable of realizing: at least a portion of one or more implementations of flow diagrams 600 (of FIG. 6), such as any of operations 602-608. In an example implementation, a server device 1200 may execute likelihood heatmap instructions 1210*a* to generate an indoor likelihood heatmap. For example, one or more server devices may generate a likelihood heatmap based, at least in part, on a count of shortest paths between pairs of points that traverse a particular point of connectivity graph as constrained by a sparse connectivity graph. Other alternatives may instead be implemented without departing from claimed subject matter.

At least one communication interface 1206 may provide one or more hardware or software interfaces between server device 1200 and other devices or human operators. Hence, communication interface 1206 may comprise a screen, a speaker, a microphone, a camera, a keyboard or keys, or other human-device input or output features. Additionally or alternatively, a communication interface 1206 may comprise a transceiver (e.g., a transmitter or a receiver), a radio, an antenna, a network interface (e.g., a wired hardware interface connector, such as a network interface card; or a wireless interface connector, such as a Bluetooth® or near field communication (NFC) unit; etc.), a local hardware interface (e.g., a universal serial bus (USB) connector, or a Light Peak® connector, etc.), or any combination thereof, etc. to communicate wireless and/or wired signals (e.g., over wireless or wired communication links) via one or more networks 1216. Communications using at least one communication interface 1206 may enable transmitting, receiving, or initiating of transmissions, etc., just to name a few examples.

One or more networks 1216 may comprise at least one wireless or wired network. Examples of networks 1216 may include, but are not limited to, a local area network (LAN), a wireless LAN (WLAN), a wide area network (WAN), a wireless WAN (WWAN), a cellular network, a telecommunications network, the internet, an ad hoc network, an infrastructure network, or any combination thereof; etc. A storage medium 1214 may store, for example, at least a portion of instructions 1210. A storage medium 1214 may be external (as shown) to server device 1200. If external, storage medium 1214 may be local or remote from server device 1200. An external implementation of a storage medium 1214 may comprise a separate memory device or may comprise part of another electronic device. Although not so explicitly illustrated, storage medium 1214 may also or alternatively be located within, or be internal to, server device 1200. Examples of storage medium 1214 may include, but are not limited to, a hard drive, a disk, a disc, a storage array, volatile memory, nonvolatile memory, a USB drive, a memory card, a computer-readable medium, or any combination thereof, etc.

Server device 1200 may include at least one interconnect 1212 that comprises one or more buses, channels, switching fabrics, storage area networks, or combinations thereof, etc. to enable signal communication between or among components of server device 1200. Other component(s) 1208 may comprise one or more other auxiliary processing, storage, or communication components; power sources; apparatuses providing other feature(s); or any combination thereof; etc. Although not explicitly illustrated in FIG. 12, one or more components of server device 1200 may be coupled to interconnect 1212 via a discrete or integrated interface. By way of example only, an interface may couple processor 1202 or communication interface 1206 to interconnect 1212.

In example implementations, a device, such as server device 1200, may comprise at least one memory 1204 and one or more processors 1202. At least one memory 1204 may store instructions 1210. One or more processors 1202 may be configured to execute instructions 1210, e.g., to perform one or more procedures, processes, operations, or any combination thereof, etc. In example implementations, an article (e.g., an article of manufacture) may comprise at least one storage medium 1214. At least one storage medium 1214 may have stored thereon instructions 1210 that are executable by one or more processors 1202, e.g., to perform one or more procedures, processes, operations, or any combination thereof, etc.

Figure 13:
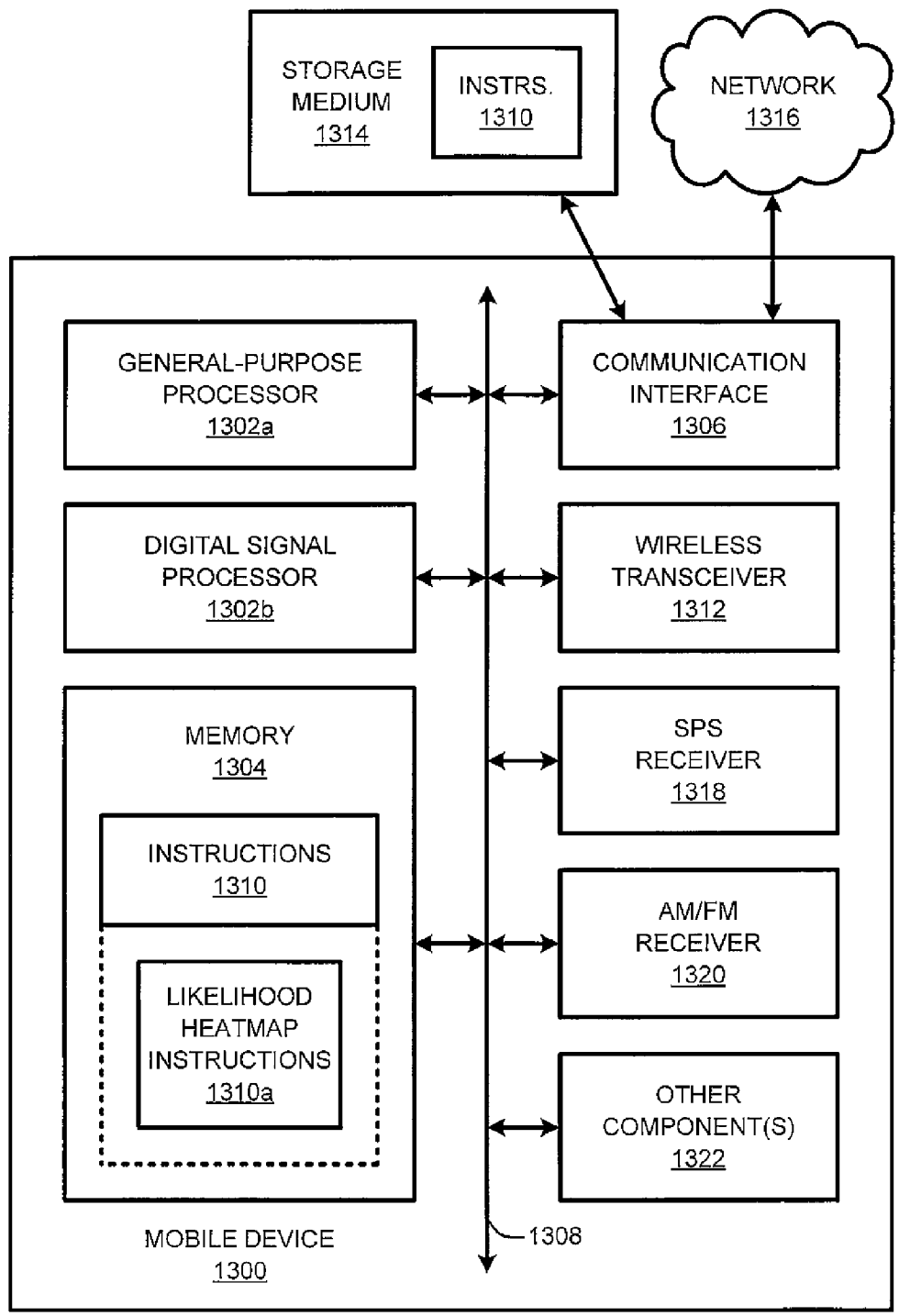
FIG. 13 is a schematic diagram illustrating an example mobile device, according to an implementation, that may implement one or more aspects relating to indoor likelihood heatmaps according to an implementation.

FIG. 13 is a schematic diagram illustrating an example mobile device 1300, according to an implementation, that may implement one or more aspects relating to indoor likelihood heatmaps including, for example, generation of a likelihood heatmap or application of a likelihood heatmap according to a particular implementation. As illustrated, mobile device 1300 may include at least one processor 1302 (e.g., a general-purpose processor 1302*a* or a digital signal processor 1302*b*), one or more memories 1304, at least one communication interface 1306, at least one interconnect 1308, at least one wireless transceiver 1312, at least one SPS receiver 1318, at least one AM/FM receiver 1320, or one or more other component(s) 1322, or any combination thereof, etc. FIG. 13 also illustrates at least one storage medium 1314 or one or more networks 1316. A mobile device 1300 may have access to storage medium 1314 or networks 1316. Memory 1304 or storage medium 1314 may include instructions 1310. However, a mobile device 1300 may alternatively include or have access to more, fewer, or different components from those that are illustrated without departing from claimed subject matter.

For certain example implementations, a mobile device 102 (e.g., of FIG. 1) may comprise a mobile device 1300. Mobile device 1300 may include or comprise at least one electronic device, such as a device with processing capabilities. Mobile device 1300 may comprise, for example, any electronic device having at least one processor or memory. Examples of mobile devices 1300 may include, but are not limited to, a notebook or laptop computer, a personal digital assistant (PDA), a netbook, a slate or tablet computer, a portable entertainment device, a mobile phone, a smart phone, a mobile terminal (MT), a mobile station (MS), a user equipment (UE), a personal navigation device (PND), or any combination thereof, etc.

One or more processors 1302 may comprise one or more separate or integrated processors. As illustrated, one or more processors 1302 may comprise a general-purpose processor 1302*a*, a digital signal processor 1302*b*, or any combination thereof, etc. General-purpose processor 1302*a* may be programmed with instructions, such as instructions 1310, to become a special purpose processor that implements at least a portion of any process(es), method(s), or procedure(s), etc. that are described herein. A digital signal processor (DSP) 1302*b* may comprise a processor having an architecture that is at least partially enhanced to process digital signals. Digital signal processor 1302*b* may be programmed with instructions, such as instructions 1310, to become a special purpose digital signal processor that implements at least a portion of any process(es), method(s), or procedure(s), etc. that are described herein. General-purpose processor 1302*a* or digital signal processor 1302*b* may operate individually or jointly to implement any e.g. procedure(s) that are described herein.

Memory 1304 may store, contain, or otherwise provide access to at least a portion of instructions 1310 that may be executable by a processor 1302. Examples for instructions 1310 may include, but are not limited to: a program, or an application, etc. or portion thereof; operational data structures; processor-executable instructions; computer-implemented instructions; code or coding; or any combination thereof; etc. Execution of instructions 1310 by one or more processors 1302 may transform mobile device 1300 into a special purpose computing device, apparatus, platform, or any combination thereof, etc.

Instructions 1310 may include, by way of example but not limitation, likelihood heatmap instructions 1310*a*. In certain example implementations, likelihood heatmap instructions 1310*a* may correspond to, for example, instructions that are capable of realizing: at least a portion of one or more implementations of flow diagram 700 (e.g., of FIG. 7), such as any of operations 702-704. In an example implementation, a mobile device 1300 may execute likelihood heatmap instructions 1310*a* to use an indoor likelihood heatmap in conjunction with a navigational application. Other alternatives may instead be implemented without departing from claimed subject matter.

At least one communication interface 1306 may provide one or more hardware or software interfaces between mobile device 1300 and other devices or human operators. Hence, communication interface 1306 may comprise a screen, a speaker, a microphone, a camera, a keyboard or keys, or other human-device input or output features. Additionally or alternatively, a communication interface 1306 may comprise a transceiver (e.g., a transmitter or a receiver), a radio, an antenna, a network interface (e.g., a wired hardware interface connector, such as a network interface card; or a wireless interface connector, such as a Bluetooth® or near field communication (NFC) unit; etc.), a local hardware interface (e.g., a universal serial bus (USB) connector, or a Light Peak® connector, etc.), or any combination thereof, etc. to communicate wireless and/or wired signals (e.g., over wireless or wired communication links) via one or more networks 1316. Communications using at least one communication interface 1306 may enable transmitting, receiving, or initiating of transmissions, etc., just to name a few examples.

One or more networks 1316 may comprise at least one wireless or wired network. Examples of networks 1316 may include, but are not limited to, a local area network (LAN), a wireless LAN (WLAN), a wide area network (WAN), a wireless WAN (WWAN), a cellular network, a telecommunications network, the internet, an ad hoc network, an infrastructure network, or any combination thereof, etc. A storage medium 1314 may comprise memory to store, for example, at least a portion of instructions 1310. A storage medium 1314 may be external (as shown) to mobile device 1300. If external, storage medium 1314 may be local or remote from mobile device 1300. An external implementation of a storage medium 1314 may comprise a separate memory device or may comprise part of another electronic device. Although not so explicitly illustrated, storage medium 1314 may also or alternatively be located within, or be internal to, mobile device 1300. Examples of storage medium 1314 may include, but are not limited to, a hard drive, a disk, a disc, a storage array, a storage network, volatile memory, nonvolatile memory, a USB drive, a memory card, a computer-readable medium, or any combination thereof, etc.

Additionally or alternatively to communication interface 1306, mobile device 1300 may include one or more transmitters, receivers, transceivers, or any combination thereof, etc. By way of example only, a mobile device may include at least one wireless transceiver 1312, at least one SPS receiver 1318, at least one AM/FM receiver 1320, or any combination thereof, etc. A wireless transceiver 1312 may transmit or receive wireless signals in accordance with, e.g., at least one selected protocol. Example protocols may include, but are not limited to, a cellular or WWAN protocol, a Wi-Fi protocol, a Bluetooth® protocol, or any combination thereof, etc. Wireless transceiver 1312 may communicate, for example, with network 1316 via wireless signals. An SPS receiver 1318 may at least receive SPS signals from one or more satellites, pseudolites, positioning beacons, or any combination thereof, etc. An AM/FM receiver 1320 may at least receive amplitude modulated (AM) or frequency modulated (FM) signals. Although not explicitly shown in FIG. 13, wireless transceiver 1312, SPS receiver 1318, AM/FM receiver 1320, or any combination thereof, etc. may be coupled to one or more individual antennas or shared antennas.

Mobile device 1300 may include at least one interconnect 1308 that comprises one or more buses, channels, switching fabrics, or combinations thereof, etc. to enable signal communication between or among components of mobile device 1300. Other component(s) 1322 may comprise one or more other sensors, power sources, apparatuses providing other feature(s), or any combination thereof, etc. In an example implementation, sensors may include, but are not limited to, a thermometer, a barometer, an accelerometer, a compass, a gyroscope, a pedometer, or any combination thereof, etc. Although not explicitly illustrated in FIG. 13, one or more components of mobile device 1300 may be coupled to interconnect 1308 via a discrete or integrated interface. By way of example only, one or more interfaces may couple wireless transceiver 1312 or general-purpose processor 1302*a* to interconnect 1308.

In example implementations, a device, such as mobile device 1300, may comprise at least one memory 1304 and one or more processors 1302. At least one memory 1304 may store instructions 1310. One or more processors 1302 may be configured to execute instructions 1310, e.g., to perform one or more procedures, processes, operations, or any combination thereof, etc. In example implementations, an article (e.g., an article of manufacture) may comprise at least one storage medium 1314. At least one storage medium 1314 may have stored thereon instructions 1310 that are executable by one or more processors 1302, e.g., to perform one or more procedures, processes, operations, or any combination thereof, etc.

Methodologies described herein may be implemented by various means depending upon applications according to particular features or examples. For example, such methodologies may be implemented in hardware, firmware, software, discrete/fixed logic circuitry, or any combination thereof, etc. In a hardware or logic circuitry implementation, for example, a processor or processing unit may be implemented within one or more application specific integrated circuits (ASICs), digital signal processors (DSPs), digital signal processing devices (DSPDs), programmable logic devices (PLDs), field programmable gate arrays (FPGAs), processors generally, controllers, micro-controllers, microprocessors, electronic devices, other devices or units programmed to execute instructions or designed to perform functions described herein, or combinations thereof, just to name a few examples. Herein, the term "control logic" may encompass logic implemented by software, hardware, firmware, discrete/fixed logic circuitry, or any combination thereof, etc.

For a firmware or software implementation, methodologies may be implemented with modules (e.g., procedures, functions, etc.) having instructions that perform functions as described herein. Any machine readable medium tangibly embodying instructions may be used in implementing methodologies as described herein. For example, software coding may be stored in a memory or executed by a processor. Memory may be implemented within a processor or external to a processor. As used herein the term "memory" may refer to any type of long term, short term, volatile, nonvolatile, or other storage memory/medium and is not to be limited to any particular type of memory or number of memories, or type of media upon which memory is stored.

In one or more example implementations, functions described herein may be implemented in hardware, software, firmware, discrete/fixed logic circuitry, any combination thereof, etc. If implemented in firmware or software, functions may be stored on a physical computer-readable (e.g., via electrical digital signals) medium as one or more instructions or code (e.g., realized as at least one article of manufacture comprising at least one storage medium having instructions stored thereon). Computer-readable media may include physical computer storage media that may be encoded with a data structure, a computer program, or any combination thereof, etc. A storage medium may be any available physical medium that can be accessed by a computer. By way of example, and not limitation, such computer-readable media may comprise RAM, ROM, EEPROM, CD-ROM or other optical disc storage, magnetic disk storage or other magnetic storage devices, or any other medium that can be used to store desired program code in the form of instructions or data structures and that can be accessed by a computer or processor thereof. Disk and disc, as used herein, may include compact disc (CD), laser disc, optical disc, digital versatile disc (DVD), floppy disk and blu-ray disc, where disks usually reproduce data magnetically, and discs usually reproduce data optically with lasers.

Also, computer instructions, code, or data, etc. may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, or microwave. Combinations of the above may also be included within the scope of physical transmission media. Such computer instructions or data may be transmitted in portions (e.g., first and second portions) at different times (e.g., at first and second times).

Network or networks may operate in accordance with any one or more of many different systems, standards, or protocols, etc., just to name a few examples. For example, for an implementation including at least one wireless communication network, such wireless communication network(s) may comprise one or more of a wireless wide area network (WWAN), a wireless local area network (WLAN), a wireless personal area network (WPAN), any combination thereof, and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, or any combination thereof, and so on. A CDMA network may implement one or more radio access technologies (RATs) such as cdma2000, Wideband-CDMA (W-CDMA), Time Division Synchronous Code Division Multiple Access (TD-SCDMA), or any combination thereof, etc., just to name a few radio technology examples. Here, cdma2000 may include technologies implemented according to IS-95 standards, IS-2000 standards, IS-856 standards, or any combination thereof, etc. A TDMA network may implement Global System for Mobile Communications (GSM), Digital Advanced Mobile Phone System (D-AMPS), or some other RAT or RATs. GSM and W-CDMA examples are described in documents from a consortium named "3rd Generation Partnership Project" (3GPP). Cdma2000 examples are described in documents from a consortium named "3rd Generation Partnership Project 2" (3GPP2). 3GPP and 3GPP2 documents are publicly available. A WLAN may include an IEEE 802.11x network, and a WPAN may include a Bluetooth network or an IEEE 802.15x network, just to name a few examples. Wireless communication networks may include so-called next generation technologies (e.g., "4G"), such as, for example, Long Term Evolution (LTE), Advanced LTE, WiMAX, Ultra Mobile Broadband (UMB), or any combination thereof, or the like.

Some portions of this Detailed Description are presented in terms of algorithms or symbolic representations of operations on binary digital signals that may be stored within a memory of a specific apparatus or special purpose computing device or platform. In the context of this particular Specification, the term specific apparatus or the like includes a general purpose computer once it is programmed to perform particular functions pursuant to instructions from program software or instructions. Algorithmic descriptions or symbolic representations are examples of techniques used by those of ordinary skill in the signal processing or related arts to convey the substance of their work to others skilled in the art. An algorithm here, and generally, may be considered to be a self-consistent sequence of operations or similar signal processing leading to a desired result. In this context, operations or processing may involve physical manipulation of physical quantities. Typically, although not necessarily, such quantities may take the form of electrical or magnetic signals capable of being stored, transferred, combined, compared, transmitted, received, or otherwise manipulated.

It has proven convenient at times, principally for reasons of common usage, to refer to such signals as bits, data, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "obtaining," "transmitting," "receiving," "performing," "applying," "predicting", "positioning/locating," "storing," "providing," "projecting", "generating", "using", "assigning" or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Likewise, the terms, "and" and "or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic, etc. in the singular or may be used to describe some combination of features, structures, or characteristics, etc. However, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concepts described herein. Therefore, it is intended that claimed subject matter not be limited to the particular examples disclosed, but that such claimed subject matter may also include all aspects falling within the scope of appended claims, and equivalents thereof.

What is claimed is:

1. A method for a device, the method comprising:
projecting multiple grid points over a schematic map of an indoor area, said schematic map indicating multiple obstructions of said indoor area;
determining feasible paths between grid point pairs of said multiple grid points;
determining an indication for a particular grid point of said multiple grid points, said indication being based, at least in part, on how many of said feasible paths traverse said particular grid point; and
generating a likelihood heatmap for use in one or more navigational applications based, at least in part, on said indication.

2. The method of claim 1, wherein said generating of said likelihood heatmap comprises:
traversing said feasible paths between starting grid points and ending grid points to establish traversed paths, said traversed paths including intermediate grid points subject to a smallest cost based, at least in part, on lengths of said traversed paths; and
attributing a likelihood value to said intermediate grid points of said traversed paths for said likelihood heatmap.

3. The method of claim 2, further comprising:
affecting said smallest cost based, at least in part, on a sparse connectivity graph for said indoor area.

4. The method of claim 3, wherein said affecting of said smallest cost comprises:
attributing a reduced cost to said intermediate grid points based, at least in part, on said sparse connectivity graph.

5. The method of claim 1, wherein said feasible paths between said grid point pairs are based, at least in part, on a sparse connectivity graph for said indoor area.

6. The method of claim 5, wherein said determining of said feasible paths between said grid point pairs comprises:
directing said feasible paths between said grid point pairs through at least one grid point of said sparse connectivity graph.

7. The method of claim 6, wherein said at least one grid point of said sparse connectivity graph is associated with a number of absorbed grid points from said multiple grid points; and further comprises:
determining said indication further based, at least in part, on said number of absorbed grid points.

8. The method of claim 1, wherein said indication comprises a count of said feasible paths traverse said particular grid point.

9. A method comprising:
obtaining a likelihood heatmap for an indoor area that includes multiple obstructions, said likelihood heatmap corresponding to a schematic map of said indoor area and including multiple grid points, wherein likelihood values that are indicated for individual grid points of said multiple grid points are based at least partly on an indication of how many feasible paths between grid point pairs traverse said individual grid points; and
determining an estimated location of a mobile device within said indoor area based, at least in part, on said likelihood heatmap.

10. The method of claim 9, further comprising:
implementing at least one navigational application using said estimated location of said mobile device.

11. The method of claim 9, wherein said likelihood values are attributed to intermediate grid points of traversed paths; and wherein said traversed paths are established with said feasible paths between starting grid points and ending grid points of said traversed paths, said intermediate grid points of said traversed paths subject to a smallest cost that is based, at least in part, on lengths of said traversed paths.

12. The method of claim 11, wherein said intermediate grid points of said traversed paths are further subject to a sparse connectivity graph that is overlaid on a connectivity graph that includes said multiple grid points.

13. The method of claim 9, wherein said feasible paths between said grid point pairs are based, at least in part, on a sparse connectivity graph for said indoor area and are constrained between said grid point pairs to pass through at least one grid point of said sparse connectivity graph.

14. The method of claim 9, wherein said indication comprises a count of said feasible paths between said grid point pairs traverse said individual grid points.

15. A device for generating a likelihood heatmap, the device comprising:
at least one memory to store instructions; and
one or more processors to execute said instructions to:
project multiple grid points over a schematic map of an indoor area, said schematic map indicating multiple obstructions of said indoor area;
determine feasible paths between grid point pairs of said multiple grid points;
determine an indication for a particular grid point of said multiple grid points, said indication being based, at least in part, on how many of said feasible paths traverse said particular grid point; and
generate said likelihood heatmap for use in one or more navigational applications based, at least in part, on said indication.

16. The device of claim 15, wherein to generate said likelihood heatmap said one or more processors are further to execute said instructions to:
traverse said feasible paths between starting grid points and ending grid points to establish traversed paths, said traversed paths including intermediate grid points subject to a smallest cost based, at least in part, on lengths of said traversed paths; and
attribute a likelihood value to said intermediate grid points of said traversed paths for said likelihood heatmap.

17. The device of claim 16, wherein said one or more processors are further to execute said instructions to:
affect said smallest cost based, at least in part, on a sparse connectivity graph for said indoor area.

18. The device of claim 17, wherein to affect said smallest cost said one or more processors are further to execute said instructions to:
attribute a reduced cost to said intermediate grid points based, at least in part, on said sparse connectivity graph.

19. The device of claim 15, wherein said feasible paths between said grid point pairs are based, at least in part, on a sparse connectivity graph for said indoor area.

20. The device of claim 19, wherein to determine said feasible paths between said grid point pairs said one or more processors are further to execute said instructions to:
direct said feasible paths between said grid point pairs through at least one grid point of said sparse connectivity graph.

21. The device of claim 20, wherein said at least one grid point of said sparse connectivity graph is associated with a number of absorbed grid points from said multiple grid points; and wherein said one or more processors are further to execute said instructions to:
determine said indication based, at least in part, on said number of absorbed grid points.

22. The device of claim 15, wherein said indication comprises a count of said feasible paths traverse said particular grid point.

23. A mobile device for using a likelihood heatmap, the mobile device comprising:
at least one memory to store instructions; and
one or more processors to execute said instructions to:
obtain said likelihood heatmap for an indoor area that includes multiple obstructions, said likelihood heatmap corresponding to a schematic map of said indoor area and including multiple grid points, wherein likelihood values that are indicated for individual grid points of said multiple grid points are based at least partly on an indication of how many feasible paths between grid point pairs traverse said individual grid points; and
determine an estimated location of said mobile device within said indoor area based, at least in part, on said likelihood heatmap.

24. The mobile device of claim 23, wherein said one or more processors are further to execute said instructions to:
implement at least one navigational application using said estimated location of said mobile device.

25. The mobile device of claim 23, wherein said likelihood values are attributed to intermediate grid points of traversed paths; and wherein said traversed paths are established with said feasible paths between starting grid points and ending grid points of said traversed paths, said intermediate grid points of said traversed paths subject to a smallest cost that is based, at least in part, on lengths of said traversed paths.

26. The mobile device of claim 25, wherein said intermediate grid points of said traversed paths are further subject to a sparse connectivity graph that is overlaid on a connectivity graph that includes said multiple grid points.

27. The mobile device of claim 23, wherein said feasible paths between said grid point pairs are based, at least in part, on a sparse connectivity graph for said indoor area and are constrained between said grid point pairs to pass through at least one grid point of said sparse connectivity graph.

28. The mobile device of claim 23, wherein said indication comprises a count of said feasible paths between said grid point pairs traverse said individual grid points.

29. A device for generating a likelihood heatmap, the device comprising:
means for projecting multiple grid points over a schematic map of an indoor area, said schematic map indicating multiple obstructions of said indoor area;
means for determining feasible paths between grid point pairs of said multiple grid points;
means for determining an indication for a particular grid point of said multiple grid points, said indication being based, at least in part, on how many of said feasible paths traverse said particular grid point; and
means for generating said likelihood heatmap for use in one or more navigational applications based, at least in part, on said indication.

30. The device of claim 29, wherein said means for generating said likelihood heatmap comprises:
means for traversing said feasible paths between starting grid points and ending grid points to establish traversed paths, said traversed paths including intermediate grid points subject to a smallest cost based, at least in part, on lengths of said traversed paths; and
means for attributing a likelihood value to said intermediate grid points of said traversed paths for said likelihood heatmap.

31. The device of claim 30, further comprising:
means for affecting said smallest cost based, at least in part, on a sparse connectivity graph for said indoor area.

32. The device of claim 31, wherein said means for affecting said smallest cost comprises:
means for attributing a reduced cost to said intermediate grid points based, at least in part, on said sparse connectivity graph.

33. The device of claim 29, wherein said feasible paths between said grid point pairs are based, at least in part, on a sparse connectivity graph for said indoor area.

34. The device of claim 33, wherein said means for determining said feasible paths between said grid point pairs comprises:
means for directing said feasible paths between said grid point pairs through at least one grid point of said sparse connectivity graph.

35. The device of claim 34, wherein said at least one grid point of said sparse connectivity graph is associated with a number of absorbed grid points from said multiple grid points; and wherein said further comprises:
means for determining said indication further based, at least in part, on said number of absorbed grid points.

36. The device of claim 29, wherein said indication comprises a count of said feasible paths traverse said particular grid point.

37. A mobile device for using a likelihood heatmap, the mobile device comprising:
means for obtaining said likelihood heatmap for an indoor area that includes multiple obstructions, said likelihood heatmap corresponding to a schematic map of said indoor area and including multiple grid points, wherein likelihood values that are indicated for individual grid points of said multiple grid points are based at least partly on an indication of how many feasible paths between grid point pairs traverse said individual grid points; and
means for determining an estimated location of said mobile device within said indoor area based, at least in part, on said likelihood heatmap.

38. The mobile device of claim 37, further comprising:
means for implementing at least one navigational application using said estimated location of said mobile device.

39. The mobile device of claim 37, wherein said likelihood values are attributed to intermediate grid points of traversed paths; and wherein said traversed paths are established with said feasible paths between starting grid points and ending grid points of said traversed paths, said intermediate grid points of said traversed paths subject to a smallest cost that is based, at least in part, on lengths of said traversed paths.

40. The mobile device of claim 39, wherein said intermediate grid points of said traversed paths are further subject to a sparse connectivity graph that is overlaid on a connectivity graph that includes said multiple grid points.

41. The mobile device of claim 37, wherein said feasible paths between said grid point pairs are based, at least in part, on a sparse connectivity graph for said indoor area and are constrained between said grid point pairs to pass through at least one grid point of said sparse connectivity graph.

42. The mobile device of claim 37, wherein said indication comprises a count of said feasible paths between said grid point pairs traverse said individual grid points.

43. An article comprising: at least one non-transitory storage medium having stored thereon instructions executable by one or more processors to:
  project multiple grid points over a schematic map of an indoor area, said schematic map indicating multiple obstructions of said indoor area;
  determine feasible paths between grid point pairs of said multiple grid points;
  determine an indication for a particular grid point of said multiple grid points, said indication being based, at least in part, on how many of said feasible paths traverse said particular grid point; and
  generate a likelihood heatmap for use in one or more navigational applications based, at least in part, on said indication.

44. The article of claim 43, wherein to generate said likelihood heatmap said instructions stored on said at least one storage medium are further executable by the one or more processors to:
  traverse said feasible paths between starting grid points and ending grid points to establish traversed paths, said traversed paths including intermediate grid points subject to a smallest cost based, at least in part, on lengths of said traversed paths; and
  attribute a likelihood value to said intermediate grid points of said traversed paths for said likelihood heatmap.

45. The article of claim 44, wherein said instructions stored on said at least one storage medium are further executable by the one or more processors to:
  affect said smallest cost based, at least in part, on a sparse connectivity graph for said indoor area.

46. The article of claim 45, wherein to affect said smallest cost said instructions stored on said at least one storage medium are further executable by the one or more processors to:
  attribute a reduced cost to said intermediate grid points based, at least in part, on said sparse connectivity graph.

47. The article of claim 43, wherein said feasible paths between said grid point pairs are based, at least in part, on a sparse connectivity graph for said indoor area.

48. The article of claim 47, wherein to determine said feasible paths between said grid point pairs said instructions stored on said at least one storage medium are further executable by the one or more processors to:
  direct said feasible paths between said grid point pairs through at least one grid point of said sparse connectivity graph.

49. The article of claim 48, wherein said at least one grid point of said sparse connectivity graph is associated with a number of absorbed grid points from said multiple grid points; and wherein said instructions stored on said at least one storage medium are further executable by the one or more processors to:
  determine said indication further based, at least in part, on said number of absorbed grid points.

50. The article of claim 43, wherein said indication comprises a count of said feasible paths traverse said particular grid point.

51. An article comprising: at least one non-transitory storage medium having stored thereon instructions executable by one or more processors to:
  obtain a likelihood heatmap for an indoor area that includes multiple obstructions, said likelihood heatmap corresponding to a schematic map of said indoor area and including multiple grid points, wherein likelihood values that are indicated for individual grid points of said multiple grid points are based at least partly on an indication of how many feasible paths between grid point pairs traverse said individual grid points; and
  determine an estimated location of a mobile device within said indoor area based, at least in part, on said likelihood heatmap.

52. The article of claim 51, wherein said instructions stored on said at least one storage medium are further executable by the one or more processors to:
  implement at least one navigational application using said estimated location of said mobile device.

53. The article of claim 51, wherein said likelihood values are attributed to intermediate grid points of traversed paths; and wherein said traversed paths are established with said feasible paths between starting grid points and ending grid points of said traversed paths, said intermediate grid points of said traversed paths subject to a smallest cost that is based, at least in part, on lengths of said traversed paths.

54. The article of claim 53, wherein said intermediate grid points of said traversed paths are further subject to a sparse connectivity graph that is overlaid on a connectivity graph that includes said multiple grid points.

55. The article of claim 51, wherein said feasible paths between said grid point pairs are based, at least in part, on a sparse connectivity graph for said indoor area and are constrained between said grid point pairs to pass through at least one grid point of said sparse connectivity graph.

56. The article of claim 51, wherein said indication comprises a count of how many feasible paths between said grid point pairs traverse said individual grid points.

\* \* \* \* \*